(12) United States Patent
Fields et al.

(10) Patent No.: US 11,897,909 B2
(45) Date of Patent: *Feb. 13, 2024

(54) METHODS FOR THE PURIFICATION OF L-GLUFOSINATE

(71) Applicant: BASF SE, Ludwigshafen (DE)

(72) Inventors: Stephen Craig Fields, Baltimore, MD (US); Matthew Richard Oberholzer, Wilmington, DE (US); Brian Michael Green, Lutherville, MD (US); Samir Kulkarni, East Lyme, CT (US); Jennifer Nelson, Kokomo, IN (US); Patricia Andres, West Lafayette, IN (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,724

(22) Filed: Mar. 8, 2023

(65) Prior Publication Data

US 2023/0219985 A1    Jul. 13, 2023

Related U.S. Application Data

(63) Continuation of application No. 16/631,963, filed as application No. PCT/US2018/042503 on Jul. 17, 2018, now Pat. No. 11,634,442.

(60) Provisional application No. 62/653,736, filed on Apr. 6, 2018, provisional application No. 62/533,944, filed on Jul. 18, 2017.

(51) Int. Cl.
*C07F 9/535* (2006.01)
*C07F 9/30* (2006.01)

(52) U.S. Cl.
CPC .............. *C07F 9/535* (2013.01); *C07F 9/301* (2013.01)

(58) Field of Classification Search
None
See application file for complete search history.

(56) References Cited

U.S. PATENT DOCUMENTS

| | | |
|---|---|---|
| 3,360,554 A | 12/1967 | Sotoo et al. |
| 4,499,027 A | 2/1985 | Minowa et al. |
| 5,324,708 A | 6/1994 | Moreno et al. |
| 5,420,329 A | 5/1995 | Zeiss |
| 5,737,309 A | 4/1998 | Ewell et al. |
| 5,767,309 A | 6/1998 | Knorr et al. |
| 7,198,943 B2 | 4/2007 | Koda et al. |
| 7,772,426 B2 | 8/2010 | Minowa et al. |
| 8,076,373 B2 | 12/2011 | Martin |

(Continued)

FOREIGN PATENT DOCUMENTS

| | | |
|---|---|---|
| CN | 103342718 A | 10/2013 |
| CN | 103351323 A | 10/2013 |

(Continued)

OTHER PUBLICATIONS

Brittain ("Polymorphism in Pharmaceutical Solids" 1999, p. 235-237) (Year: 1999).*

(Continued)

*Primary Examiner* — Amy C Bonaparte
(74) *Attorney, Agent, or Firm* — MARSHALL, GERSTEIN & BORUN LLP

(57) ABSTRACT

Solid forms of L-glufosinate materials, including crystalline L-glufosinate ammonium, are described.

4 Claims, 5 Drawing Sheets

(56) References Cited

U.S. PATENT DOCUMENTS

| | | | |
|---|---|---|---|
| 8,791,046 | B2 | 7/2014 | Saxell et al. |
| 9,328,101 | B2 | 5/2016 | Reinhard et al. |
| 11,634,442 | B2* | 4/2023 | Fields .................... A01N 57/20 562/11 |
| 2003/0172698 | A1 | 9/2003 | Koda et al. |
| 2014/0309453 | A1* | 10/2014 | Nakanishi ............... C07F 9/301 562/11 |
| 2017/0253897 | A1 | 9/2017 | Green et al. |

FOREIGN PATENT DOCUMENTS

| | | |
|---|---|---|
| CN | 103827127 A | 5/2014 |
| CN | 105131032 A | 12/2015 |
| CN | 105669742 A | 6/2016 |
| CN | 106916857 A | 7/2017 |
| CN | 106188134 B | 3/2018 |
| EP | 0249188 A2 | 12/1987 |
| EP | 2762484 A1 | 8/2014 |
| JP | S37-17959 B | 11/1962 |
| JP | 2002249390 A | 9/2002 |
| JP | 2008530115 A | 8/2008 |
| JP | 2010509277 A | 3/2010 |
| JP | 2015518841 A | 7/2015 |
| KR | 10-2002-0068292 A | 8/2002 |
| WO | WO-2016/116797 A1 | 7/2016 |
| WO | WO-2017/095687 A1 | 6/2017 |
| WO | WO-2018/108797 A1 | 6/2018 |
| WO | WO-2020/214631 A1 | 10/2020 |

OTHER PUBLICATIONS

Supplementary Information Regarding Crystalline Forms A, B, and D, 2023.
Airaudo et al., Stability of glutamine and pyroglumatic acid under model system conditions: influence of physical and technological factors, J. Food Sci., 52(6):1750-2 (1987).
Bartsch et al., Stereospecific production of the herbicide phosphinothricin (glufosinate) by transamination: cloning, characterization, and overexpression of the gene encoding a phosphinothricin-specific transaminase from Escherichia coli, Appl. Environ. Microbiol., 56(1):7-12 (1990).
Byrn et al., Pharmaceutical solids: a strategic approach to regulatory considerations, Pharm. res., 12(7):945-54 (1995).
Desrosiers, The potential of preform, Modern Drug Discovery, pp. 40-43,. Jan. 2004.
Florence, Approaches to high-throughput physical form screening and discovery, Chapter 5 IN: Brittain (ed.), Polymorphism in Pharmaceutical Solids, 2nd edition, CRC Press (2009).
Hawkes et al., delta-glufosinate as a male sterility agent for hybrid seed production, Plant Biotechnol. J., 9:301-14 (2011).
Hilfiker et al., Approaches to Polymorphis Screening, Chapter 11 pp. 287-308, IN: Hilfiker (ed.), Polymorphism: in the Pharmaceutical Industry, Weinheim, Germany: Wiley-VCH Verlag GMBH & Co. KGAA (2006).
International Application No. PCT/US2018/042503, International Search Report and Written Opinion, dated Sep. 28, 2018.
Kamzolova et al., Chemically assisted microbial production of succinic acid by the yeast Yarrowia lipolytica grown on ethanol, Appl. Microbiol. Biotechnol., 83:1027-34 (2009).
Li et al., A novel procedure for the synthesis of ammonium glufosinate, Organic Preparations and Procedures International: The New Journal for Organic Synthesis, 46(6):568 (2014).
Miller et al., Identifying the stable polymorph early in the drug discovery-development process, Pharmaceutical Development and Technology, 10(2):291-7 (2005).
Newman, Specialized solid form screening techniques, Organic Process Research & Development, 17:457-71 (2013).
Orlowski et al., Enzymology of pyrrolidone carboxylic acid, The Enzymes, 4:123-51 (1971).
Royer et al., Determination of glufosinate ammonium and its metabolite (AE F064619 and AE F061517) residues in water by gas crhomatography with tandem mass spectrometry after ion exchange cleanup and derivatization, J. Agricultural and Food Chem., 48(11):5184-9 (2000).
Safety Data Sheet/ Forfeit™ 280 Herbicide, downloaded from the Internet at: <http://msdsdigital.com/system/files/mpB91002.pdf> (2013).
Schulz et al., Stereospecific production of the herbicide phosphinothricin (glufosinate) by transamination: isolation and characterization of a phosphinothricin-specific transaminase from Escherichia coli, Appl. Environ. Microbiol., 56(1):1-6 (1990).
Seifert et al., Glutaminyl cyclases display signficant catalytic proficiency for glutamyl substrates, Biochemistry, 48(50):11831-3 (2009).
Zeiss et al., Enantioselective synthesis of both enantiomers of phosphinothricin via asymmetric hydrogenation of alpha-acylamidoacrylates, J. Org. Chem., 56(5):1783-8 (1991).
Protest and Filing of Prior Art in Canadian Patent Application No. 3,070,104 dated Jun. 2, 2022.
Bulk Drug Form Screening and Selection, in Noriyuki Takada and Innovative Drug Development Stage, Pharm. Stage, 6(10):20-25 (2007).
Japanese Patent Application No. 2020-502197, Notice of Reasons for Refusal, dated Dec. 20, 2022.
Ashizawa, Optimization of the salt-crystal form, and crystallisation technology, Pharm Tech Japan, 2002 , vol. 18, No. 10,pp. 81-96.
Miller et al., Solvent systems for crystallization and polymorph selection, Chapter 3 IN: Borchardt et al. (eds.), Biotechnology: Pharmaceutical Aspects, vol. VI (Augustijns et al., eds): Solvent Systems and Their Selection in Pharmaceutics and Biopharmaceutics, Springer (2007).
Paulus et al., Molecular and crystal structure of L-phosphinothricin (2-ammonio-4-methylphosphinico-butyrate), Zeitschrift für Kristallographie-Crystalline Materials, vol. 160, No. 1-4, 1982, pp. 63-68.

* cited by examiner

METHODS FOR THE PURIFICATION OF L-GLUFOSINATE

CROSS-REFERENCES TO RELATED APPLICATIONS

The present application is a divisional of U.S. patent application Ser. No. 16/631,963, which is a U.S. National Phase of PCT/US2018/042503, filed on Jul. 17, 2018, which claims priority to U.S. Provisional Pat. Appl. No. 62/533,944, filed on Jul. 18, 2017, and U.S. Provisional Pat. Appl. No. 62/653,736, filed on Apr. 6, 2018; all of the aforementioned application are hereby incorporated herein by reference in their entireties.

FIELD

Described herein are methods for the purification of L-glufosinate.

BACKGROUND

The herbicide glufosinate is a non-selective, foliarly-applied herbicide considered to be one of the safest herbicides from a toxicological or environmental standpoint. Current commercial chemical synthesis methods for glufosinate yield a racemic mixture of L- and D-glufosinate (Duke et al. 2010 *Toxins* 2:1943-1962). However, L-glufosinate (also known as phosphinothricin or (S)-2-amino-4-(hydroxy(methyl)phosphinoyl)butanoic acid) is much more potent than D-glufosinate (Ruhland et al. (2002) *Environ. Biosafety Res.* 1:29-37).

Therefore, methods are needed to produce only or primarily the active, L-glufosinate form. Previously, effective methods to generate pure L-glufosinate, or a mixture of D- and L-glufosinate enriched for L-glufosinate, have not been available.

SUMMARY

Compositions and methods for isolating L-glufosinate from a composition comprising L-glufosinate and glutamate are provided. The method comprises converting the glutamate to pyroglutamate followed by the isolation of L-glufosinate from the pyroglutamate and other components of the composition to obtain substantially purified L-glufosinate. In one embodiment, the composition comprising L-glufosinate and glutamate is subjected to an elevated temperature for a sufficient time to allow for the conversion of glutamate to pyroglutamate, followed by the isolation of L-glufosinate from the pyroglutamate and other components of the composition to obtain substantially purified L-glufosinate. In another embodiment, the glutamate is converted to pyroglutamate by enzymatic conversion followed by removal of the pyroglutamate from the composition by ion exchange to obtain a composition comprising substantially purified L-glufosinate. The volume of the composition may be reduced to obtain a concentrated solution of L-glufosinate or reduced to obtain a solid powder of L-glufosinate. In one embodiment, the purified L-glufosinate is present in the final composition at a concentration of 70% or greater, 80% or greater, or 90% or greater of the sum of L-glufosinate, glutamate, and pyroglutamate. In some embodiments, a portion of the glutamate in the starting composition is separated from the L-glufosinate by a crystallization step prior to converting the glutamate to pyroglutamate. Also provided herein are methods for the isolation of 2-oxoglutaric acid (also referred to herein as 2-oxoglutarate) from the composition after L-glufosinate has been removed. 2-Oxoglutaric acid can be removed, for example, by ion exchange to obtain a composition of substantially pure 2-oxoglutaric acid which then can be converted easily to substantially pure succinic acid.

The methods described herein produce a substantially pure composition of L-glufosinate. In further embodiments, the methods produce a substantially pure composition of 2-oxoglutaric acid. Crystalline forms of L-glufosinate materials are also provided.

DETAILED DESCRIPTION

Figure 1:
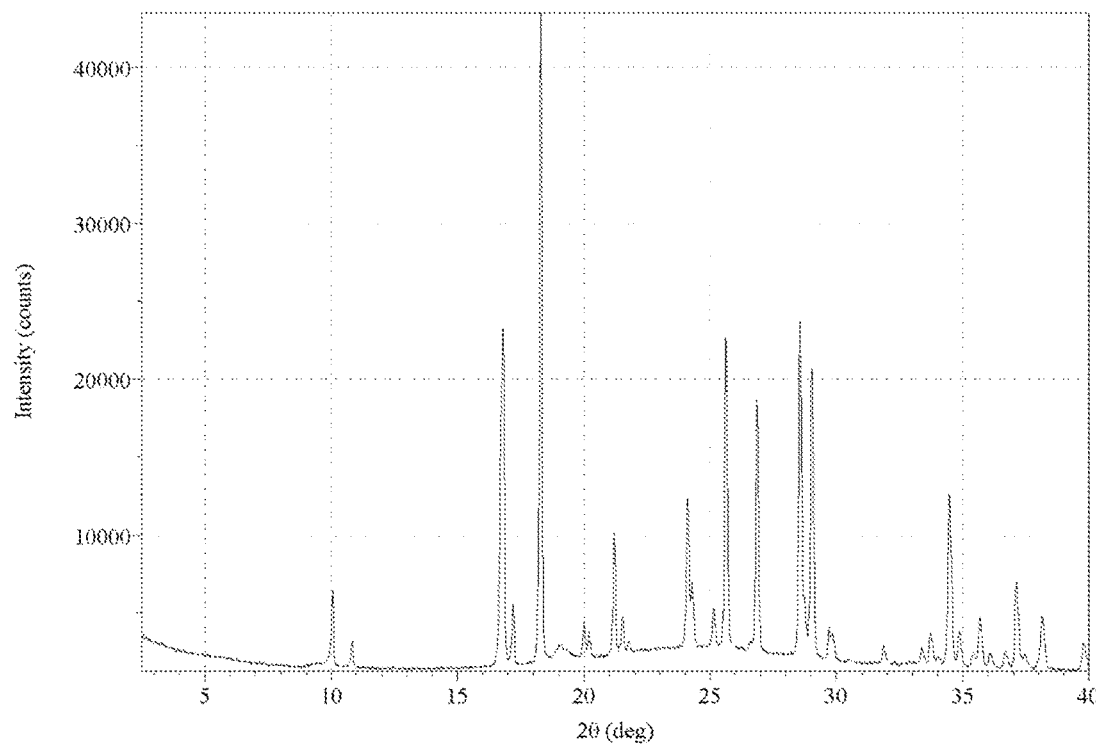
FIG. 1 shows an XRPD pattern collected with Cu-Kα radiation for L-glufosinate ammonium Form A.

Compositions and methods for the production of a substantially purified composition of L-glufosinate (also known as phosphinothricin or (S)-2-amino (hydroxy(methyl) phosphonoyl)butanoic acid) are provided. U.S. patent application Ser. No. 15/445,254 ("the '254 application") filed Feb. 28, 2017, herein incorporated by reference, is drawn to compositions and methods for the production of L-glufosinate. The method involves the oxidative deamination of D-glufosinate to PPO (2-oxo-4-(hydroxy(methyl)phosphinoyl)butyric acid), followed by the specific amination of PPO to L-glufosinate, using an amine group from one or more amine donors. By combining these two reactions, the proportion of L-glufosinate can be substantially increased in a racemic glufosinate mixture. Thus, the method of the '254 application can use the racemic D-/L-glufosinate mixture as the starting mixture and convert the inactive D-form into the active L-form. The method of the '254 method results in a composition comprising a mixture of L-glufosinate, PPO, and D-glufosinate, where L-glufosinate is the predominant compound among the mixture of L-glufosinate, PPO, and D-glufosinate. Glutamate (which refers to L-glutamate, D-glutamate, or a combination of the two), also known as glutamic acid (which refers to L-glutamic acid, D-glutamic acid, or a combination of the two) may be present in the composition when glutamate or L-glutamate is used as the amine donor in the amination of PPO to L-glufosinate.

The separation of L-glufosinate from 2-oxoglutarate, PPO, and glutamic acid in the post-reaction mixture typically requires multiple operations because the chemical structures and chemical properties of these components are very similar. L-glutamic acid presents the main challenge because it is present in a high concentration relative to L-glufosinate and is structurally similar to L-glufosinate.

I. Methods of Purification

Provided herein are methods for purifying L-glufosinate from a composition that includes L-glufosinate and glutamate. The methods include converting glutamate to pyroglutamate to facilitate isolation of L-glufosinate. The glutamate can be converted to pyroglutamate by subjecting the composition to an elevated temperature for a sufficient period of time to convert the majority of glutamate to pyroglutamate (which is also referred to herein as pyroglutamic acid). See, for example, PCT 2010/013242, U.S. 2003/0018202, Corma et al. (2007) *Chem. Rev.* 107:2411-2502, Purwaha et al. (2014) *Anal. Chem.* 86(12):5633-5637, Dubourg et al. (1956) *Bulletin de la Societe Chimique de France* 1351-1355, and *Helv. Chim. Acta* (1958) 181, all of which are herein incorporated by reference. Alternatively, the glutamate can be converted to pyroglutamate by enzymatic transformation. Upon exposing the resulting mixture to cation exchange resin, glufosinate (and, when present, glutamate) typically adsorbs more strongly than pyroglutamic acid. Upon exposing the resulting mixture to anion exchange resin, pyroglutamic acid typically adsorbs more strongly than glufosinate.

For non-enzymatic conversion of glutamic acid to pyroglutamic acid, acidic pH is preferred. If the reaction mixture is not already acidic, an acid can be used to adjust the pH of the reaction mixture. Suitable acids that can be used to adjust the pH include hydrochloric acid, sulfuric acid, trifluoroacetic acid, phosphoric acid, acetic acid, or any other material with a pKa<5. See, for example, DE 3920570 C2, which is herein incorporated by reference. The pH can be adjusted to a value from about 0.4 to about 7, a value from about 1.0 to about 6.0, a value from about 2.0 to about 5.0, or a value from about 2.5 to about 3.5.

As indicated, the glutamate can be converted to pyroglutamate by subjecting the composition to an elevated temperature for a sufficient period of time to convert the majority of glutamate to pyroglutamate. The elevated temperature can be at least 100° C., at least 110° C., at least 120° C., at least 130° C., at least 140° C., at least 150° C., at least 160° C., at least 170° C., at least 180° C., or at least 190° C. Typically, the elevated temperature can range from about 120° C. to about 180° C. Any method suitable for increasing the temperature of a material to an elevated temperature, as described above, can be used and is encompassed within the methods described herein. For example, the elevated temperature can be reached by heating the mixture or composition in an autoclave under modest pressure; heating neat or in a high boiling inert solvent using a heating mantle, boiling plate, oil or silicone bath; recirculating fluid in a jacketed reactor; or any other methods used to apply heat as known to those skilled in the art. The use of heat guns and open flames are also encompassed within these methods.

As used herein, the term "majority" of a component refers to an amount of at least 50% by weight of the component. For example, the term "majority" can refer to 50 wt. % or more, 55 wt. % or more, 60 wt. % or more, 65 wt. % or more, 70 wt. % or more, 75 wt. % or more, 80 wt. % or more, 85 wt. % or more, 90 wt. % or more, 95 wt. % or more, or 99 wt. % or more of the component.

As used herein, the term "substantially pure" or "substantially purified," as related to a particular component, means that the component is present in a composition in an amount of 70% or greater, 75% or greater, 80% or greater, 85% or greater, 90% or greater, or 95% or greater of the sum of the total components present in the composition.

The conversion of glutamate to pyroglutamate is allowed to proceed for a sufficient period of time such that a majority of the glutamate is converted to pyroglutamate. Generally, the majority of glutamate is converted in about 2 hours to about 20 hours (e.g., about 2 hours to about 15 hours). That is, the conversion time under elevated temperatures can be about 2 hours or greater, about 3 hours or greater, about 4 hours or greater, about 5 hours or greater, about 6 hours or greater, about 7 hours or greater, about 8 hours or greater, about 9 hours or greater, about 10 hours or greater, about 11 hours or greater, about 12 hours or greater, about 13 hours or greater, about 14 hours or greater, about 15 hours or greater, about 16 hours or greater, about 17 hours or greater, about 18 hours or greater, about 19 hours or greater, or about 20 hours.

The reaction mixture can be concentrated before or after converting glutamic acid to pyroglutamic acid. Any means of concentration known by those skilled in the art can be used, such as distillation, including distillation under vacuum, thin film evaporation, wiped film evaporation, pervaporation, reverse osmosis, and the like. Water and other volatile materials removed by concentration can be recycled for use in the process, if desired. Optionally, the reaction mixture can be concentrated during the conversion of glutamic acid to pyroglutamic acid by removing water vapor and other volatile material from the reaction mixture, as this mode of operation utilizes time and energy most efficiently.

Following the conversion of glutamic acid to pyroglutamic acid, the reaction mixture can be treated with an adsorbent or other solid material to reduce or remove color without any loss of L-glufosinate. Suitable adsorbents include activated charcoal (also known as activated carbon), bone char, and the like. Polymeric materials, such as those described by U.S. Pat. No. 4,950,332, which is herein incorporated by reference, or other ion exchange resins can be particularly useful in commercial operation for the decolorization of the reaction mixture. Other treatments known to those skilled in the art can be used to decolorize the reaction mixture.

In one example, various amounts of activated carbon may be added to portions of the same reaction mixture after the conversion to pyroglutamic acid. After mixing for approximately 20 minutes at room temperature, the activated carbon can be filtered on top of a bed of pre-washed Celite®. The filter cake is then washed with water and the cake wash combined with the filtrate. In this example when the filtrate was then checked for L-glufosinate recovery relative to an untreated sample using pyroglutamic acid as an internal standard, the table below shows the recovery and color observations.

| Wt % activated carbon | L-glufosinate recovery | Color observation |
| --- | --- | --- |
| 0.25 | 104% | Slightly orange |
| 0.5 | 103% | Slightly orange |
| 1.0 | 98% | Slightly orange |
| 3.0 | 103% | No color |
| 5.0 | 98% | No color |

In one embodiment, after the conversion of glutamic acid to pyroglutamic acid, the reaction mixture can be cooled to a temperature below 20° C. In a preferred embodiment, the reaction mixture is adjusted to about pH 3 using sulfuric acid prior to the reaction, then adjusted to about pH 6 with sodium hydroxide after the conversion of glutamic acid to pyroglutamic acid, and then cooled to a temperature just above the freezing point of the reaction mixture (e.g., about 5° C. or below). Optionally, the reaction mass is concentrated and/or decolorized as described above prior to cooling. The advantage to this procedure is that sodium sulfate will precipitate or crystallize from the reaction mixture. The solid sodium sulfate, which could be in anhydrous or hydrated form, is substantially pure and can be removed from the reaction mixture by filtration, centrifugation, or any other suitable means to separate solids from liquids known by those skilled in the art. Optionally, seed crystals of anhydrous or hydrated sodium sulfate can be added to the mixture to initiate crystallization.

Salt removal achieved by the combination of evaporative concentration, cooling crystallization and filtration is not particularly efficient when compared to membrane separation processes. Membrane separators are employed in many industries to achieve a variety of separations as the technology is well developed; a description of common techniques can be found in "Unit Operations of Chemical Engineering", W. L. McCabe, J. C. Smith and P. Harriott, sixth edition; McGraw-Hill, 2001; ISBN: 0070393664. Reverse osmosis and ultrafiltration, described in "Ultrafiltration Handbook", M. Cheryan, Technomic Publishing, 1986; ISBN: 0877624569, are examples of membrane separations that are practiced at the commercial scale. The term "nanofiltration" is used to describe separations that use membranes with pores that are larger than those in reverse osmosis membranes but smaller than those in ultrafiltration membranes. Membrane pore size is an important parameter because in many applications the membrane is selected to separate components of a mixture based on the difference in size their sizes. U.S. Pat. No. 5,447,635, incorporated herein by reference, discloses a membrane separation process in which salts and other low molecular weight solutes are removed from an aqueous solution of Iopamidol, an X-ray contrast agent; at the same time, the solution of Iopamidol is concentrated. Membrane separation processes can be used in combination with other unit operations to optimize the purity of the product stream. U.S. Pat. No. 5,811,581, incorporated herein by reference, discloses a process in which the aqueous stream containing Iopamidol is first purified by a chromatographic separation followed by a membrane separation process; examples teach that Iopamidol can be obtained in high purity and high yield using the combined techniques.

Membranes may be used to remove inorganic salts and some water from the L-glufosinate mixture either before or after the conversion of glutamic acid to pyroglutamic acid. The mixture containing L-glufosinate may be pumped through the membrane separator whereupon the inorganic salts and some water travel through the membrane away from the L-glufosinate mixture. Salts may include the sodium salt of the acid used to adjust the pH before the glutamic acid conversion, for example, sodium sulfate, if sulfuric acid is used to adjust pH, or sodium chloride, if hydrochloric acid is used to adjust pH. Selected membranes may allow some glutamic acid and/or pyroglutamic acid to pass through along with salt and water.

Suitable membranes may be made from natural or synthetic polymers, including but not limited to cellulose, polycarbonate, polyethylene, polypropylene, polysulfone, polylactic acid, polyacrylamide, polyvinylidine and the like. The polymers may be chemically modified if desired. Alternatively, a ceramic membrane may be used. U.S. Pat. Nos. 3,556,305; 3,556,992; 3,628,669; and 3,950,255 disclose methods of making membranes and their use in separations processes. Standard equipment for membrane separations can be used for the membrane separation. Those skilled in the art will recognize that membranes can be used in a number of configurations, including but not limited to, flat sheets for plate-and-frame configuration or hollow fiber tubes for shell-and-tube configuration. Spiral wound membrane modules can be particularly efficient when used for this purpose. U.S. Pat. Nos. 3,228,876; 3,401,798; and 3,682,317 disclose several membrane configurations suitable for commercial operation.

The L-glufosinate mixture may be pumped through the membrane separator in a single pass or several passes to reach the desired level of desalting and concentration. The resulting desalted and concentrated L-glufosinate mixture can be further purified if desired.

The L-glufosinate can be isolated from the pyroglutamate and any other components of the composition to obtain a composition of substantially purified L-glufosinate. The terms "substantially purified L-glufosinate" or "substantially pure L-glufosinate" are used to indicate that the amount of L-glufosinate in the final composition is 70% or greater, 75% or greater, 80% or greater, 85% or greater, 90% or greater, or 95% or greater of the sum of L-glufosinate, glutamate, pyroglutamate, and any other component in the final composition.

In some cases, glutamate can be converted to pyroglutamate by enzymatic transformation. See, for example, U.S. Pat. No. 3,086,916, herein incorporated by reference. In this manner, a glutaminyl-peptide cyclotransferase, (for example, E.C. 2.3.2.5), can be added to the composition comprising L-glufosinate and glutamate for a sufficient time to allow for the conversion of glutamate to pyroglutamate. The amount of time sufficient for conversion will vary depending on the activity and the concentration of enzyme used in the reaction. Generally, the time will be at least 2 hours, at least 4 hours, at least 6 hours, at least 8 hours, at least 10 hours, at least 12 hours, or more.

In some embodiments, a crystallization step can be used to remove a portion of the glutamate prior to conversion of the remaining glutamate to pyroglutamate. In this manner, in a first step, a portion of the glutamate can be crystallized and removed from the starting composition by filtration, centrifugation, or any other suitable solid-liquid separation process known by those skilled in the art. For example, 0.1 wt. % or greater, 0.5 wt. % or greater, 1 wt. % or greater, 5 wt. % or greater, 10 wt. % or greater, 15 wt. % or greater, or 20 wt. % or greater of the glutamate present can be crystallized and removed from the starting composition. The crystallized glutamate can be reused, for example, in a subsequent enzymatic transformation of D-glufosinate.

For crystallization, the composition can be adjusted to a pH of from about 3 to about 5 (e.g., from about 3.5 to about 4.5, from about 3.5 to about 3.8, or from about 3.7 to about 4.2) with the addition of an acid. Suitable acids for adjusting the pH include hydrochloric acid, sulfuric acid, trifluoroacetic acid, phosphoric acid, acetic acid, or any other material with a pKa<5. See, for example, DE 3920570 C2, which is herein incorporated by reference.

In some examples, the temperature of the composition is carefully controlled. In this manner, the composition can be heated to a temperature of about 30° C., about 35° C., about 40° C., and the like followed by the addition of acid. The acid, for example, concentrated hydrochloric acid or sulfuric acid, is added either continuously or in portions at a slow rate to a suitable container which holds the reaction mixture. Agitation of the mixture during the acid addition is preferred and may be accomplished by any suitable means. With sufficient mixing, the addition of acid to the mixture is generally insensitive to the rate of addition when the pH of the mixture exceeds about pH 5 because precipitation or crystallization is generally not observed at above pH 5. In the laboratory, using suitable equipment, the acid addition below pH 5 is performed at a dropwise rate, dropwise rate meaning less than 0.1 mL, less than 0.2 mL, less than 0.3 mL, less than 0.4 mL portions every several seconds, such that the crystallization of glutamic acid begins before the end of the concentrated hydrochloric acid or sulfuric acid addition. For example, when practiced in the laboratory, approximately 35 mL to 40 mL of 10 M sulfuric acid can be added dropwise over a period of time (e.g., 15 to 20 minutes) to a batch approximately 1 L in volume.

The reaction mixture can then be heated to an elevated temperature of about 35° C. to about 90° C. (e.g., about 40° C. to about 80° C., about 50° C. to about 70° C., or about 55° C. to about 65° C.), and held at the elevated temperature for at least about 20 minutes (e.g., at least about 25 minutes or at least about 30 minutes). In some examples, some of the heat associated with the addition of the acid is not immediately removed and the reaction mixture is allowed to slowly self-heat. After holding at the elevated temperature as described, the resulting composition is then slowly cooled over time to 0° C. Optionally, the composition can be cooled to 0° C. over a duration of several minutes to several days, and can be held for at least about 30 minutes, about 45 minutes, about 50 minutes, about 60 minutes, over multiple hours, or over multiple days before filtering the reaction mass.

One advantage of controlling the temperature as described above is to produce high purity glutamate crystals which are easy to filter. Optionally, the crystallization method could be performed with the presence of glutamic acid seed crystals (e.g., glutamic acid crystals added to the mixture during the acid addition, glutamic acid crystals left over from a previous batch, or glutamic acid crystals present in a continuous crystallizer) to assist with the growth of crystals to a size suitable for easy filtration.

Another advantage of controlling the temperature as described above, more particularly of reducing the temperature below room temperature, is that more glutamic acid will crystallize and therefore the quantity of glutamic acid which remains in the filtrate will be reduced. Optionally, a water miscible solvent could be added to further reduce the solubility of glutamic acid in the mixture. The addition of a water miscible solvent also allows lower temperatures to be reached without freezing of the mixture.

The present method of crystallizing glutamic acid from the reaction mass or starting composition greatly reduces the amount of glutamic acid in solution. The residual glutamic acid in the reaction mixture or composition can be converted to pyroglutamic acid at an elevated temperature as described above. The resulting pyroglutamic acid is easily separated from L-glufosinate in a single ion exchange step (i.e., either a cation or an anion exchange, both cation exchange and anion exchange steps are not required), or other separation approaches, and this results in a high purity L-glufosinate with low levels of glutamic acid.

In one embodiment, an anion exchange resin is used to purify L-glufosinate from pyroglutamic acid, 2-oxoglutarate, and PPO at a slightly basic, neutral, or acidic pH at ambient or elevated temperatures. In some examples, the interaction between L-glufosinate and the anion exchange resin may not be as strong as the interactions between the anion exchange resin and each of the 2-oxoglutarate, PPO, and pyroglutamate. The difference in interaction behavior can be used to effect purification of the L-glufosinate. In this procedure, the anion exchange resin can be charged to a suitable container, such as a tank or a column. In some examples, the anion exchange resin is converted to a hydroxy form using an aqueous solution of a suitable inorganic base, such as sodium hydroxide or potassium hydroxide. In some instances, the anion resin is converted to sulfate of bisulfate form using sulfuric acid or inorganic sulfate or bisulfate salts. The resin is then equilibrated at the desired temperature through either external heating (e.g., flowing a heat transfer fluid in the jacket of the container) or by pumping fluid at the desired temperature through the container or both. The resin is equilibrated at the desired pH using dilute acid, dilute base, and/or water. The reaction mixture can be obtained from the glutamic acid cyclization step, which optionally could be concentrated as described above, and/or which optionally could be decolorized following a procedure described above, can be adjusted to the same pH as the resin. The reaction mixture can also be adjusted to the same temperature as the resin and pumped through the anion exchange resin in the container, typically in a down flow fashion. Effluent exiting the container can be collected in portions. Portions of the effluent containing a majority of L-glufosinate can be combined together to form a solution of substantially purified L-glufosinate. Without being bound to any particular theory, pyroglutamic acid, 2-oxoglutaric acid, PPO, and other impurities interact with the anion exchange resin such that the components travel through the column at different rates compared to L-glufosinate thereby allowing substantially purified L-glufosinate to be collected in a separate solution.

Many kinds of commercially available anion exchange resins can be used to prepare substantially purified L-glufosinate, as described above. Examples of suitable resins include those constructed of a cross-linked copolymer backbone (e.g., made with a monovinyl monomer such as styrene, acrylate, and the like, and a polyvinyl crosslinking agent such as divinylbenzene, etc.). U.S. Pat. Nos. 3,458,976 and 6,924,317, both of which are incorporated herein by reference, disclose other monovinyl monomers and polyvinyl crosslinking agents that could be used to generate suitable copolymer backbone material. Resins made in a variety of porosities, including microporous and macroporous, can be used. The terms "microporous" and "macroporous" refer to the size range of pores in a solid particle. Two common methods for determining pore size are nitrogen adsorption-desorption and mercury porosimetry (see W. C. Connor et al. 1986 *Langmuir* 2(2):151-154). It is understood by those skilled in the art that macroporous materials contain both macropores and mesopores; mesopores range in size from about 20 angstroms to about 500 angstroms and macropores are greater than about 500 angstroms in size. Microporous materials have micropores which are less than 20 angstroms in size. See PCT/US2016/063219, which is incorporated herein by reference. Gel type resins, such as those described by U.S. Pat. Nos. 4,256,840 and 5,244,926, both of which are incorporated herein by reference, are considered to be microporous and can be used as well. Resin particles in the form of a bead, meaning spherical or nearly spherical in shape, are particularly useful in the present method. Beads may be uniform (also known as "monodisperse"), Gaussian, or polydisperse in particle size distribution. "Uniform" or "monodisperse" means at least 90 volume percent of the beads have a particle diameter from about 0.8 to about 1.2, and more preferably 0.85 to 1.15 times the volume average particle diameter. See PCT/US2016/063220, incorporated herein by reference.

Resins can be converted to anion exchange resins by functionalization with one or more types of amines. One method by which resins can be functionalized is by subjecting the copolymer to a chloromethylation reaction followed by reaction with primary amines, secondary amines, tertiary amines, aminoalcohols, polyamines, or ammonia, as described in U.S. Pat. No. 6,924,317. Anion exchange resins with an anion capacity of from about 0.1 to about 4 milliequivalents per gram wherein anion capacity is measured according to ASTM D2187-94 (reapproved 2004), are suitable for use in the present method. Resins functionalized with primary and secondary amines are known to those skilled in the art as weak base anion resins. Resins functionalized with tertiary amines and tertiary polyamines, known as strong base anion exchange resins to those skilled in the art, are particularly suitable for use in the present method. In one embodiment, a mixture of strong base anion exchange resins and weak base anion exchange resins is used to produce substantially purified L-glufosinate.

The size of the resin particles can be selected to achieve purification at an acceptable pressure drop in the equipment used for the ion exchange process. The preferred median volume average diameter of resin particles used in the method ranges from about 10 microns to about 2000 microns; a particularly useful range of median diameter is from about 100 microns to about 1000 microns. Examples of suitable resins include, but are not limited to, DOWEX™ MARATHON™ A, DOWEX™ MONOSPHERE™ 550A, DOWEX™ MONOSPHERE™ MSA, DOWEX™ XUR-1525-L09-046, an experimental, gel-type, uniform particle size in the range of 300 microns, strong base anion resin, Type I (trimethylamine quaternary ammonium, in the chloride form, obtained from the Dow Chemical Company), as well as others known to those skilled in the art.

In some examples, an elevated temperature is used for the separation. The reaction mixture fed to the column, as well as the column itself, can be maintained at a temperature from about 25° C. to about 30° C., from about 30° C. to about 35° C., from about 35° C. to about 40° C., from about 45° C. to about 50° C., from about 50° C. to about 55° C., from about 55° C. to about 60° C., from about 60° C. to about 65° C., or from about 65° C. to about 70° C. The temperature of the column can be maintained by flowing a heating fluid in a jacketed column, using a heating mantle applied to the column walls, maintaining the column inside a heated enclosure or by any other means of heating known to those skilled in the art.

The separation can be conducted in a pH range from about pH 0.4 to pH 8; that is, at about pH 0.4, at about pH 0.6, at about pH 1, at about pH 2, at about pH 3, at about pH 4, at about pH 5, at about pH 6, at about pH 7, or about pH 8. Acids that can be used for the pH adjustment include hydrochloric acid, sulfuric acid, phosphoric acid, trifluoroacetic acid, acetic acid, methanesulfonic acid, and the like. Bases that can be used for the pH adjustment include sodium hydroxide, potassium hydroxide, ammonium hydroxide, and the like.

As known in the field of ion exchange separations, resins can be regenerated for reuse. U.S. Pat. No. 3,458,439, for example, describes methods for the regeneration of anion resins. In such a regeneration process, the resin is treated with a solution or solutions which cause previously adsorbed components to desorb from the resin and return the resin to the preferred form for the separation. Typically, the solutions contain either an acid or a base and optionally an inorganic salt such as sodium chloride, sodium phosphate, sodium sulfate, ammonium sulfate, and the like. In one embodiment, an anion exchange resin can be regenerated with caustic brine (i.e., a mixture of sodium hydroxide and sodium chloride), acidic brine (i.e., a mixture of hydrochloric acid and sodium hydroxide), sulfuric acid with or without sodium chloride, or sodium chloride alone. Useful compositions of caustic brine include concentrations of sodium hydroxide from about 0.01 M to about 0.5 M and concentrations of sodium chloride from about 0.1 M to about 1.5 M. Useful compositions of acidic brine include concentrations of hydrochloric acid from about 0.01 M to about 0.5 M and concentrations of sodium chloride from about 0.1 M to about 1.5 M. In some examples, acidic brine includes sulfuric acid concentrations from about 0.1 M to about 1.5 M and sodium chloride concentrations from about 0.1 M to about 1.5 M. Optionally, water adjusted to pH 1 with sulfuric acid can be used.

Certain methods of regeneration can be advantageous when used in the practice of the methods described herein. The methods used to produce substantially purified L-glufosinate, when combined with anion exchange resin regeneration method, can also be used to produce substantially purified 2-oxoglutaric acid (also referred to herein as 2-oxoglutarate). By substantially purified 2-oxoglutarate or substantially pure 2-oxoglutarate it is intended that the amount of 2-oxoglutarate in the final composition is 70% or greater, 75% or greater, 80% or greater, 85% or greater, 90% or greater, or 95% or greater than the sum of 2-oxoglutaric acid, L-glufosinate, glutamate, succinic acid, and pyroglutamate in the final composition. The substantially purified 2-oxoglutaric acid can be easily and efficiently converted to succinic acid (which is used as a food additive and a dietary supplement) after isolation using the present method.

In some examples, substantially purified 2-oxoglutarate can be obtained in high concentrations by purifying L-glufosinate according to methods described herein. For example, using an aqueous solution of sodium hydroxide and sodium chloride (e.g., an aqueous solution of 0.1 M NaOH and 1.5 M NaCl) as an eluent in a column chromatography method (e.g., using anion exchange resin) can result in high concentrations of substantially pure 2-oxoglutarate. 2-Oxoglutarate is a by-product of the amination of PPO and cannot be reused in the process described in the '254 application. The 2-oxoglutarate collected in the fractions exiting the column can be converted to succinic acid by contacting the 2-oxoglutarate with an excess of dilute hydrogen peroxide at room temperature. See, for example, A. Lopalco and V. J. Stella (2016) J. Pharm. Sci. 105:2879-2885, herein incorporated by reference.

Succinic acid is used in high volume as an ingredient in, or starting material for, a wide range of commercial goods. Substantially purified succinic acid produced by this method can be purified further, if desired, concentrated and/or isolated by means known to those skilled in the art. By substantially purified succinic acid or substantially pure succinic acid it is intended that the amount of succinic acid in the final composition is 70% or greater, 75% or greater, 80% or greater, 85% or greater, 90% or greater, or 95% or greater than the sum of succinic acid, L-glufosinate, glutamate, 2-oxoglutarate, and pyroglutamate in the final composition.

In another embodiment, a cation exchange resin may be used to purify L-glufosinate from pyroglutamic acid, 2-oxoglutarate, and PPO. In this embodiment, the procedure can be carried out in two steps. In the first step, the reaction mixture from the glutamic acid cyclization step can be mixed with a cation exchange resin that has been converted to the hydrogen form using a suitable acid. Such acids include, but are not limited to, concentrated hydrochloric acid, sulfuric acid, phosphoric acid, formic acid, acetic acid, trifluoroacetic acid, and methanesulfonic acid. Similarly, the reaction mixture from the glutamic acid cyclization step is adjusted to an acidic pH, that is, a pH less than about 7.0 (e.g., a pH from about 0.5 to about 1.0, from about 1.0 to about 2.0, from about 2.0 to about 3.0, from about 3.0 to about 4.0, from about 4.0 to about 5.0, from about 5.0 to about 6.0, or from about 6.0 to about 6.9). Optionally, the reaction mixture from the glutamic acid cyclization step can be concentrated and/or decolorized as described above prior to mixing with the cation resin. When mixed with the resin, L-glufosinate and residual glutamic acid adsorb onto the resin while 2-oxoglutarate, PPO, and pyroglutamate do not. After a suitable period of time, the liquid containing the impurities can be separated from the resin containing L-glufosinate. Optionally, after the adsorption of L-glufosinate is complete, the resin can be washed with a suitable liquid, such as water, which displaces residual solution containing impurities without removing L-glufosinate from the resin.

In the second step, the resin containing L-glufosinate can be mixed with a water-soluble base which causes the L-glufosinate to desorb from the resin to form a solution of substantially purified L-glufosinate. Bases suitable for the removal of L-glufosinate from the cation resin include sodium hydroxide, potassium hydroxide, ammonium hydroxide, isopropylamine, ethanolamine, diethanolamine, and the like. This procedure can be operated by contacting the resin and solution in batch mode as described above or in flow mode, wherein the resin is held stationary in a container and the solutions are passed through it. The procedure can be carried out at a suitable temperature, for example, from about 20° C. to about 70° C. That is, a temperature in the range of from about 25° C. to about 65° C., from about 30° C. to about 60° C., or from about 40° C. to about 50° C. The resin can be regenerated by contacting it with a suitable acid, such hydrochloric acid, sulfuric acid, and the like, or a mixture of acid and an inorganic salt as described above.

Many different types of commercially available cation exchange resins can be used for the purification as described above. Suitable resins for use as cation exchange resins can be constructed of a copolymer backbone with various porosities, i.e., microporous or microporous. Gel type cation exchange resins are also suitable. Suitable resins can have a uniform, Gaussian, or polydisperse particle size distribution. Those having a bead shape and a uniform particle size distribution may be preferred for the present method. The preferred mean volume average diameter of resin particles used in the present method ranges from about 10 microns to about 2000 microns, and a particularly useful range of median diameter is from about 100 microns to about 1000 microns.

Resins can be converted to strong acid cation exchange resins by subjecting the resin to a sulfonation reaction. Sulfonation occurs when the resins are contacted with various sulfonating agents such as sulfur trioxide, concentrated sulfuric acid, chlorosulfonic acid, fuming sulfuric acid, and the like (see, U.S. Pat. Nos. 2,500,149; 2,527,300; and 2,597,439, all of which are incorporated herein by reference). Some resins, such as those including carboxylic acid monomers, can function as weak acid cation resins (U.S. Pat. Nos. 4,062,817 and 4,614,751, both of which are incorporated herein by reference). Cation exchange resins with a cation capacity of from about 0.1 to about 4 milliequivalents per gram, wherein cation capacity is measured by ASTM D2187-94 (reapproved 2004), are suitable for use in the present method. Examples of suitable resins include DOWEX™ 50WX8, DOWEX™ MONOSPHERE™ 99 K/350, DOWEX™ MONOSPHERE™ C, DOWEX™ MARATHON™ MSC, as well as others known to those skilled in the art.

Those skilled in the art will recognize that multiple containers containing resin, such as those disclosed by U.S. Pat. No. 4,001,113, can be used for efficient operation of flow mode either in parallel or serial operation. Parallel operation allows for simultaneous purification of the reaction mixture in several similar containers each containing the ion exchange resin. In serial operation, partially purified L-glufosinate solution of undesired purity exiting a container of resin is fed to a subsequent container which contains fresh or regenerated resin to continue the purification process. Immediately following the feed of the partially purified L-glufosinate solution to the subsequent container, the reaction mixture that has not been mixed with resin is fed to the same container. In this way, the location of the reaction mixture moves to subsequent containers. This process is repeated with other containers in series. In some examples, the used resin is regenerated in some containers while partially purified L-glufosinate solution is fed to fresh or regenerated resin in other containers. This method is particularly suitable for continuous operation.

Optionally, the volume of solution exiting the ion exchange step which contains substantially pure L-glufosinate can be contacted with a water-miscible organic solvent to cause the precipitation of inorganic salts. Solvents which may be useful for this purpose include acetone, methanol, ethanol, 1-propanol, 2-propanol, acetonitrile, tetrahydrofuran, 1-methyl-2-propanol, 1,2-propanediol, and 1,2-ethanediol. Methanol can be particularly useful in a number of embodiments. In some embodiments, the volume of solution obtained from the ion exchange step is contacted with one or more volumes (e.g., four volumes) of methanol such that a sodium sulfate precipitate is formed. The precipitate, which contains very little L-glufosinate or no L-glufosinate, can be easily removed.

Chromatographic methods based on molecular size, known as size exclusion or gel filtration chromatography, may also be used to purify L-glufosinate from the reaction mixture. In size exclusion chromatography, a solution is passed through a container containing resin with a particular pore size distribution. Without being bound to any particular theory, solutes too large to enter the pores of the resin pass through the container relatively quickly; these solutes are excluded from moving into the resin particles. Solutes small enough to enter the pores will move into the resin particles and therefore will remain in the container for a longer period of time. Other factors in addition to solute size, for example, solute structure, concentration, presence of salts, solution pH, etc., also may influence the degree of separation obtained. It is possible that the separation of solutes may occur by multiple modes of interaction with the resin, that is, a combination of size exclusion and either adsorption or ion exchange or both. A description of the technique can be found in "Modern Size Exclusion Chromatography: Practice of Gel Permeation and Gel Filtration", second edition, A. M. Striegel, et al., John Wiley and Sons, Inc., 2009; ISBN The L-glufosinate mixture may be purified by passing the mixture through a container of suitable size exclusion resin. Components of the mixture that are smaller in size and more compact in shape will have a longer residence time within the container compared to L-glufosinate. All or a portion of the L-glufosinate in the mixture will elute from the column before the other components, including inorganic salts, pyroglutamic acid and/or glutamic acid.

Resins useful for size exclusion chromatography can be prepared as described above for ion exchange resins, with or without functionalization. U.S. Pat. Nos. 3,857,824 and 4,314,032 and British patent GB1135302A disclose additional methods for preparing resin beads for size exclusion chromatography. Suitable resins are available on the commercial scale from several manufacturers, including, but not limited to, Toyopearl® HW-40, a product of Tosoh Bioscience; SEPABEADS™ SP825L, DIAION™ HP20SS and DIAION™ HP2MGL, products of Mitsubishi Chemical Company; and Sephadex® G-10, a product of GE Life Sciences.

The technique of simulated moving chromatography ("SMB") can be used in combination with ion exchange resins or size exclusion resins to produce substantially purified L-glufosinate. SMB is described in numerous publications such as "Simulated Moving Bed Technology: Principles, Design and Process Applications", A. Rodriguez; Butterworth-Heinemann, 2015; ISBN:978-0128020241 and U.S. Pat. Nos. 2,985,589; 4,182,633; 4,319,929; 4,412,866; 5,102,553; 7,229,558; and 7,931,751, all of which are incorporated herein by reference. SMB operation efficiently utilizes resin and liquid streams, for example, the crude feed stream and eluent stream. Another advantage of SMB is that the method can be used for the continuous purification of the reaction mixture at a commercial scale. In the SMB technique, several containers are connected in series so as to form a continuous loop. Each container contains resin suited for the separation of components. Valves and piping are connected to each container for the passage of at least four different types of fluids to and from each container; an example of a valve used for this purpose is described in U.S. Pat. No. 6,431,202. These fluids are composed of the mixture to be purified, an eluent, a substantially purified stream of a fast-moving component or components and a substantially purified stream of a slow-moving component or components. The mixture to be purified and the eluent are inputs to the process (meaning fed, individually, to separate containers) while the fast-moving component(s) and slow-moving component(s) are withdrawn from the process. The resin, eluent, temperature, and flowrates used in SMB are selected so that the substantially purified product is obtained either in the fast-moving component stream or the slow-moving component stream. Without being bound to any particular theory, the technique takes advantage of the differential interactions of the components in the mixture with the resin, which result in different rates of translation of the components through the continuous loop. As a result, the resin can be utilized with greater efficiency and the volume of eluent can be minimized. In the same manner, the method can be designed such that the L-glufosinate can be the fast-moving component or the slow-moving component.

In one embodiment, SMB separation can be combined with a pretreatment step wherein one or more components of the mixture are removed by contacting the mixture with an adsorbent prior to SMB operation. Such components removed include PPO, 2-oxoglutarate, and colored bodies.

In another embodiment, SMB separation is combined with a membrane separation procedure as described previously. The membrane separation step may be used to remove inorganic salts and/or water from the solution, if desired. The membrane separation procedure can be practiced before or after the SMB separation.

The methods described herein remove approximately 80% or more (e.g., about 85% or more, about 87% or more, or about 90% or more) of the unreacted glutamic acid as determined by $^1$H-NMR, although HPLC and other analytical methods can also be used to determine percentages.

Substantially pure L-glufosinate is isolated by this method. Thus, the method provides substantially pure compositions of L-glufosinate. The form of the L-glufosinate can be crystalline, a liquid, an oil, or an amorphous solid. For example, the substantially pure compositions of L-glufosinate includes material that is greater than 70% pure L-glufosinate or material that is contaminated with less than 30% D-glufosinate, PPO, 2-oxoglutarate, pyroglutamate, glutamate, or other impurities present in the starting materials, introduced during the reaction, during heating, or during cooling of the material, excluding water; greater than 80% pure L-glufosinate or material that is contaminated with less than 20% D-glufosinate, PPO, 2-oxoglutarate, pyroglutamate, glutamate, or other impurities present in the starting materials, introduced during the reaction, during heating, or during cooling of the material, excluding water; greater than 85% pure L-glufosinate or material that is contaminated with less than 15% D-glufosinate, PPO, 2-oxoglutarate, pyroglutamate, glutamate, or other impurities present in the starting materials, introduced during the reaction, during heating, or during cooling of the material, excluding water; greater than 90% pure L-glufosinate or material that is contaminated with less than 10% D-glufosinate, PPO, 2-oxoglutarate, pyroglutamate, glutamate, or other impurities present in the starting materials, introduced during the reaction, during heating, or during cooling of the material, excluding water; or greater than 95% pure L-glufosinate, or material that is contaminated with less than 5% D-glufosinate, PPO, 2-oxoglutarate, pyroglutamate, glutamate, or other impurities present in the starting materials, introduced during the reaction, during heating, or during cooling of the material, excluding water.

In one embodiment, the volume of the solution exiting the ion exchange step which contains substantially pure L-glufosinate can be reduced to a concentrate that can be formulated directly into an herbicidal product. Any means of concentration known by those skilled in the art can be used, such as distillation (including distillation under vacuum), thin film evaporation, wiped film evaporation, as well as methods utilizing a membrane, such as pervaporation, reverse osmosis, nanofiltration, ultrafiltration, and the like. Water and solvents removed by concentration can be recycled to the process, if desired.

In another embodiment, the concentrated L-glufosinate solution can be concentrated further using any of the methods described above until precipitation or crystallization occurs. Optionally, a solvent or solvent mixture can be added at any point in the process to assist with the evaporation of water, to increase the purity of the solid L-glufosinate, to increase the yield of substantially purified L-glufosinate, or to modify the size and/or shape of the solid particles. Solvents with a solubility in water of at least 10 wt. % are particularly suitable for this purpose. Useful solvents include acetone, methanol, ethanol, 1-propanol, 2-propanol, acetonitrile, tetrahydrofuran, 1-methyl-2-propanol, 1,2-propanediol, 1,2-ethanediol, triethylamine, isopropylamine, and ammonium hydroxide. The solid material produced by precipitation or crystallization can be filtered and dried to obtain a solid containing substantially pure L-glufosinate. If desired, the filtrate can be recycled back to the process. Any suitable filtration equipment and drying equipment can be used for this purpose. Water and solvent(s) removed by concentration can be recycled into the process, if desired.

In another embodiment, the volume of solution exiting the ion exchange step which contains substantially purified L-glufosinate can be concentrated until precipitation or crystallization occurs, and then evaporation of water and other volatile materials present can be continued until a substantially dry solid is obtained. One advantage of using this process is that a filtration step is not required. Optionally, a solvent or solvent mixture can be added at any point to assist with the evaporation of water such as those solvents which form an azeotrope with water, including toluene, 1-butanol, t-amyl alcohol, and the like. Optionally, a component may be added to modify the size and/or shape of the solid particles, as described above. The solid, which contains substantially purified L-glufosinate, may be obtained as a powder, granular particles, large chunks, or mixtures thereof. Any suitable equipment for carrying out this procedure may be used, including a rotary evaporator (rotovap), agitated pan dryer, horizontal axis agitated dryer, and the like. Homogenization of the dried solid can be performed, if desired. Water and solvent(s) removed during the process can be recycled, if desired.

In another embodiment, the volume of solution exiting the ion exchange step which contains substantially purified L-glufosinate can be transferred to a spray dryer. The solution can be partially concentrated prior to being transferred to the spray dryer, and the partially concentrated mixture can be in the form of a solution or, alternatively, if precipitation or crystallization has occurred, in the form of a slurry. The solid obtained after spray drying, which can be a powder or a granular form, contains substantially pure L-glufosinate. In another embodiment, agents which can improve the flowability of the dried particles or other components can be mixed into the concentrated solution or slurry prior to spray drying. In another embodiment, other materials such as formulation ingredients can be mixed into the solution or partially concentrated mixture prior to spray drying.

II. Solid Forms

A number of solid forms of L-glufosinate, including crystalline forms and amorphous forms, are also provided herein.

In some embodiments, L-glufosinate ammonium Form A is provided. In some embodiments, Form A is characterized by an X-ray powder diffraction (XRPD) pattern including at least three peaks selected from 10.1, 10.8, 16.8, 17.2, 18.3, 20.0, 20.2, 21.2, 21.5, 24.1, 24.3, 25.1, 25.6, 26.9, 28.6, 29.0, 29.7, 29.9, 31.9, 33.4, 33.7, 34.5, 34.9, 35.4, 35.7, 36.1, 36.7, 37.1, 37.5, 38.2, and 39.8 °2θ, ±0.2 °2θ, as determined on a diffractometer using Cu-Kα radiation. For example, the XRPD pattern for Form A can include 3, 4, 5, 6, 7, 8, 9, 10, 11, 12, 13, 14, 15, 16, 17, 18, 19, 20, 21, 22, 23, 24, 25, 26, 27, 28, 29, 30 or 31 such peaks.

In some embodiments, Form A is characterized by an XRPD pattern including at least six peaks selected from 10.1, 16.8, 18.3, 21.2, 24.1, 24.3, 25.6, 26.9, 28.6, 29.0, and 34.5 °2θ, ±0.2 °2θ, as determined on a diffractometer using Cu-Kα radiation. In some embodiments, Form A is characterized by an XRPD pattern including at least ten peaks selected from 10.1, 16.8, 18.3, 21.2, 24.1, 24.3, 25.6, 26.9, 28.6, 29.0, and 34.5 °2θ, ±0.2 °2θ, as determined on a diffractometer using Cu-Kα radiation. In some embodiments, Form A is characterized by an XRPD pattern which is substantially in accordance with FIG. 1. As described below, Form A has been analyzed by ion chromatography which indicated a glufosinate:ammonium ratio of approximately 1.4:1. In some embodiments, Form A is characterized by a differential scanning calorimetry (DSC) curve exhibiting an endotherm with an onset ranging from around 119 to around 123° C. In some embodiments, the DSC curve is substantially in accordance with the DSC curve depicted in FIG. 2.

L-glufosinate ammonium Form A can be prepared according to methods described below. In some embodiments, preparation of L-glufosinate ammonium Form A includes combining L-glufosinate ammonium with a polar solvent (e.g., isopropanol or methanol), or a mixture of a polar solvent and water; maintaining the resulting slurry at a temperature ranging from about 20° C. to about 50° C. for a period of time ranging from 1 hour to 14 days; and isolating Form A from the slurry.

In some embodiments, L-glufosinate Form B is provided. In some embodiments, Form B is characterized by an X-ray powder diffraction (XRPD) pattern including at least three peaks selected from 10.0, 11.4, 12.5, 16.5, 17.4, 18.1, 19.6, 20.0, 21.8, 22.9, 23.6, 24.0, 25.1, 25.5, 26.1, 26.3, 26.4, 27.9, 28.2, 28.4, 28.7, 29.2, 30.2, 30.9, 31.6, 31.7, 32.7, 33.0, 33.3, 34.3, 35.2, 36.7, 37.2, 37.4, 37.8, 38.3, 38.7, and 39.3 °2θ, ±0.2 °2θ, as determined on a diffractometer using Cu-Kα radiation. For example, the XRPD pattern for Form B can include 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, or 38 such peaks.

Figure 3:
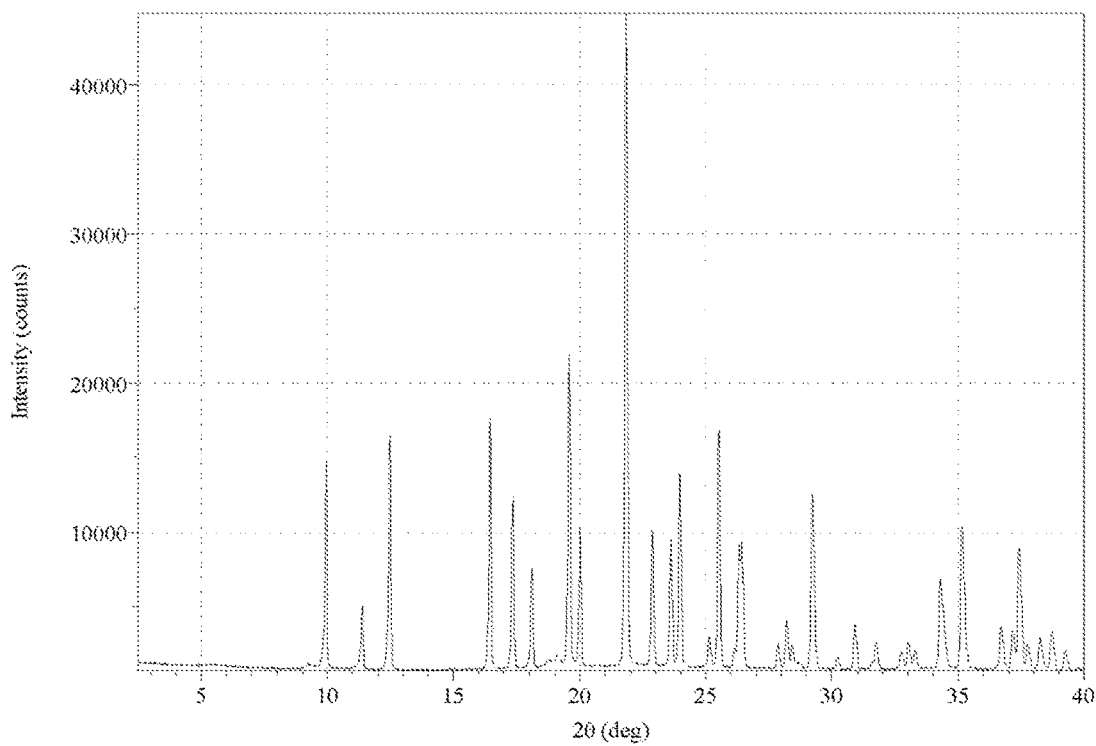
FIG. 3 shows an XRPD pattern collected with Cu-Kα radiation for L-glufosinate Form B.
Figure 4:
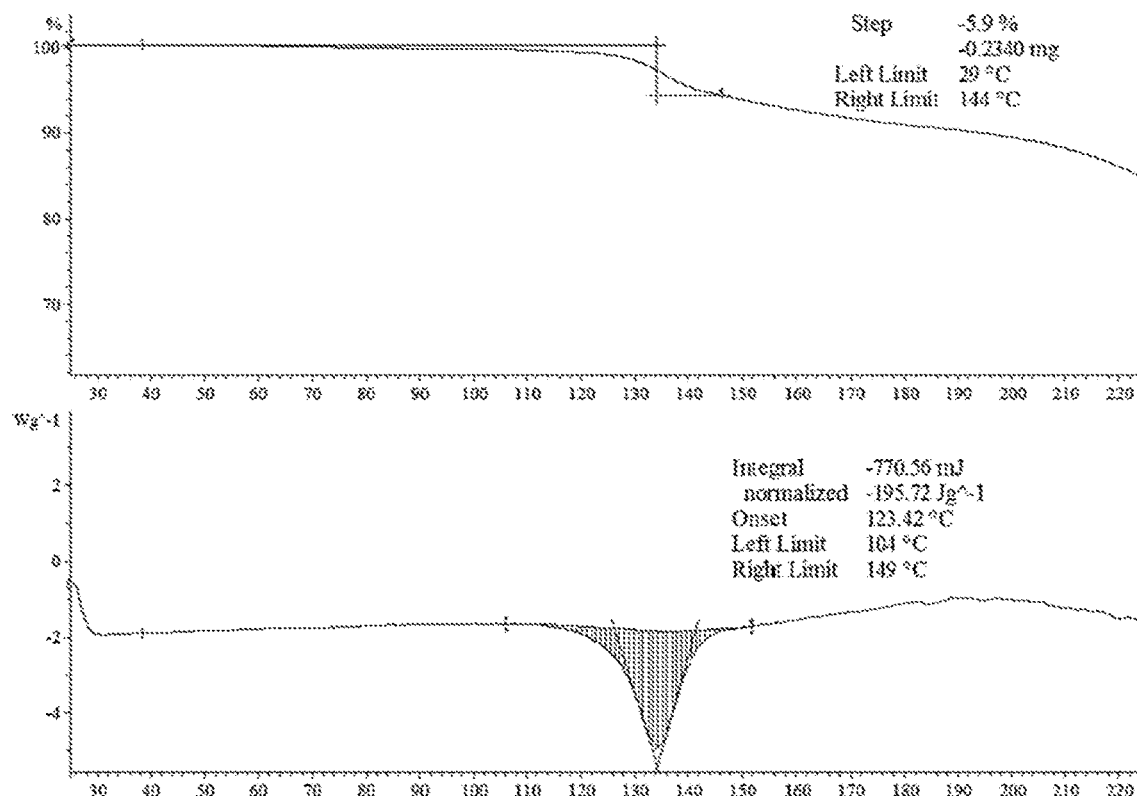
FIG. 4 shows thermal data collected for L-glufosinate Form B by thermogravimetric analysis (top trace) and differential scanning calorimetry (bottom trace).

In some embodiments, Form B is characterized by an XRPD pattern including at least six peaks selected from 10.0, 12.5, 16.5, 17.4, 18.1, 19.6, 20.0, 21.8, 22.9, 23.6, 24.0, 25.5, 26.3, 26.4, 29.2, 34.3, 35.2, and 37.4 °2θ, ±0.2 °2θ, as determined on a diffractometer using Cu-Kα radiation. In some embodiments, Form B is characterized by an XRPD pattern including at least ten peaks selected from 10.0, 12.5, 16.5, 17.4, 18.1, 19.6, 20.0, 21.8, 22.9, 23.6, 24.0, 25.5, 26.3, 26.4, 29.2, 34.3, 35.2, and 37.4 °2θ, ±0.2 °2θ, as determined on a diffractometer using Cu-Kα radiation. In some embodiments, Form B is characterized by an XRPD pattern which is substantially in accordance with FIG. 3. As described below, Form B has been analyzed by ion chromatography which indicated a glufosinate:ammonium ratio of approximately 5.3:1. In some embodiments, Form B is characterized by a differential scanning calorimetry (DSC) curve exhibiting an endotherm with an onset around 123° C. In some embodiments, the DSC curve is substantially in accordance with the DSC curve depicted in FIG. 4.

L-glufosinate Form B can be prepared according to methods described below. In some embodiments, preparation of L-glufosinate Form B includes combining L-glufosinate ammonium with a mixture of a polar solvent and water; maintaining the resulting slurry at a temperature ranging from about 20° C. to about 50° C. for a period of time ranging from 1 hour to 14 days; and isolating Form B from the slurry.

In some embodiments, L-glufosinate ammonium Form C is provided. In some embodiments, Form C is characterized by an X-ray powder diffraction (XRPD) pattern including at least three peaks selected from 9.1, 10.9, 16.1, 16.8, 17.3, 18.3, 20.1, 21.4, 21.8, 22.4, 22.7, 24.1, 24.9, 25.4, 25.6, 26.1, 26.6, 27.7, 28.3, 28.9, 30.8, 31.9, 32.6, 33.6, 33.9, 35.1, 36.6, 37.1, 37.5, 38.3, 38.9, and 39.7 °2θ, ±0.2 °2θ, as determined on a diffractometer using Cu-Kα radiation. For example, the XRPD pattern for Form C can include 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, or 34 such peaks.

In some embodiments, Form C is characterized by an XRPD pattern including at least six peaks selected from 9.1, 16.1, 16.8, 17.3, 21.8, 24.1, 24.9, 25.6, 26.1, 28.3, and 28.9 °2θ, ±0.2 °2θ, as determined on a diffractometer using Cu-Kα radiation. In some embodiments, Form C is characterized by an XRPD pattern including at least ten peaks selected from 9.1, 16.1, 16.8, 17.3, 21.8, 24.1, 24.9, 25.6, 26.1, 28.3, and 28.9 °2θ, ±0.2 °2θ, as determined on a diffractometer using Cu-Kα radiation. In some embodiments, Form C is characterized by an XRPD pattern which is substantially in accordance with FIG. 5. As described below, Form C has been analyzed by ion chromatography which indicated a glufosinate:ammonium ratio of approximately 1.4:1. In some embodiments, Form C is characterized by a differential scanning calorimetry (DSC) curve exhibiting an endotherm with an onset around 100° C. and/or an endotherm with an onset around 131° C. In some embodiments, the DSC curve is substantially in accordance with the DSC curve depicted in FIG. 6.

L-glufosinate ammonium Form C can be prepared according to methods described below. In some embodiments, preparation of L-glufosinate ammonium Form C includes contacting L-glufosinate ammonium with solvent vapor (e.g., methanol vapor) at a temperature ranging from about 20° C. to about 30° C. for a period of time ranging from 1 hour to 14 days; and isolating Form C.

In some embodiments, L-glufosinate Form D is provided. In some embodiments, Form D is characterized by an X-ray powder diffraction (XRPD) pattern including at least three peaks selected from 9.1, 11.6, 13.1, 14.1, 14.4, 16.2, 17.7, 18.2, 18.9, 19.3, 19.7, 21.2, 21.8, 22.4, 23.2, 23.5, 25.3, 25.8, 26.2, 27.2, 28.6, 29.1, 30.0, 30.6, 31.1, 31.6, 32.7, 33.5, 34.4, 34.7, 35.4, 35.9, 36.4, and 37.4 °2θ, ±0.2 °2θ, as determined on a diffractometer using Cu-Kα radiation. For example, the XRPD pattern for Form D can include 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, or 34 such peaks.

Figure 7:
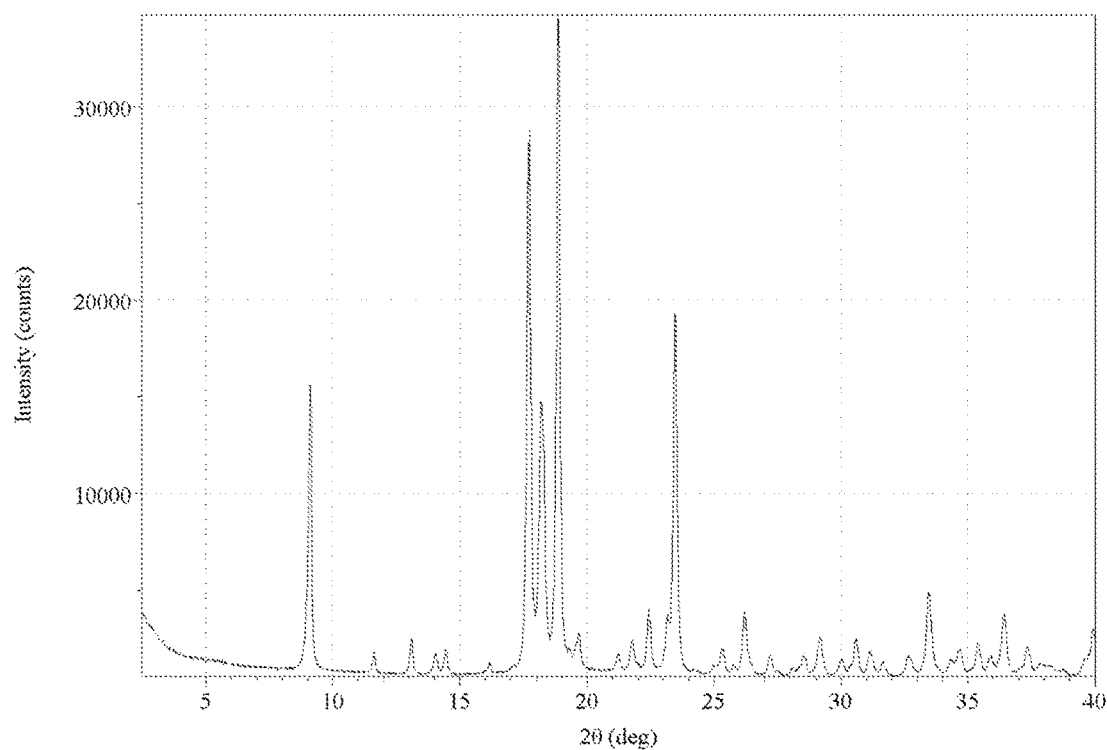
FIG. 7 shows an XRPD pattern collected with Cu-Kα radiation for L-glufosinate Form D.
Figure 8:
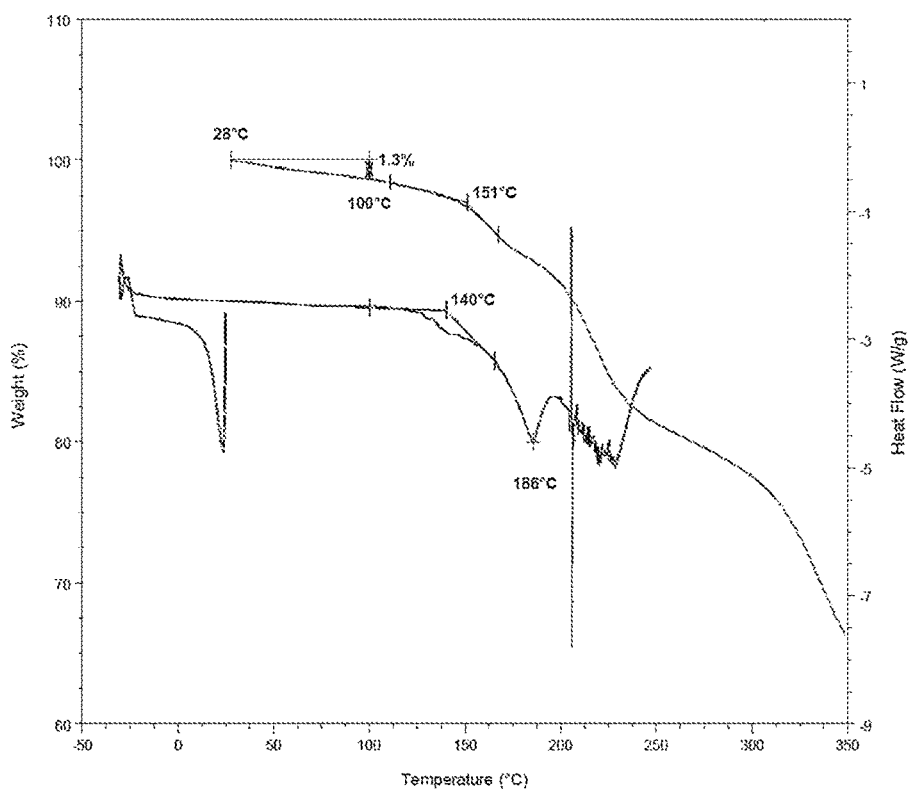
FIG. 8 shows thermal data collected for L-glufosinate Form D by thermogravimetric analysis (top trace) and differential scanning calorimetry (bottom trace).

In some embodiments, Form D is characterized by an XRPD pattern including at least six peaks selected from 9.1, 17.7, 18.2, 18.9, 22.4, 23.2, 23.5, 26.2, 33.5, and 36.4 °2θ, ±0.2 °2θ, as determined on a diffractometer using Cu-Kα radiation. In some embodiments, Form D is characterized by an XRPD pattern including peaks at 9.1, 17.7, 18.2, 18.9, 22.4, 23.2, 23.5, 26.2, 33.5, and 36.4 °2θ, ±0.2 °2θ, as determined on a diffractometer using Cu-Kα radiation. In some embodiments, Form D is characterized by an XRPD pattern which is substantially in accordance with FIG. 7. As described below, Form D has been analyzed by ion chromatography which indicated a glufosinate:ammonium ratio of approximately 3.9:1. In some embodiments, Form D is characterized by a differential scanning calorimetry (DSC) curve exhibiting a broad endotherm with an onset around 140° C. In some embodiments, the DSC curve is substantially in accordance with the DSC curve depicted in FIG. 8.

L-glufosinate Form D can be prepared according to methods described below. In some embodiments, preparation of L-glufosinate Form D includes combining L-glufosinate ammonium with a mixture of solvent (e.g., methanol, ethanol, trifluoroethanol, isopropanol, acetone, dimethyl acetamide, or the like, which are optionally anhydrous); maintaining the resulting slurry at a temperature ranging from about 50° C. to about 60° C. for a period of time ranging from 1 hour to 14 days; and isolating Form D from the slurry.

In some embodiments, L-glufosinate hydrochloride Form E is provided. In some embodiments, Form E is characterized by an X-ray powder diffraction (XRPD) pattern including at least three peaks selected from 13.1, 16.8, 18.2, 19.4, 20.5, 20.9, 21.4, 22.5, 23.4, 25.3, 26.2, 26.5, 26.9, 27.8, 28.1, 30.2, 31.2, 31.5, 32.3, 33.8, 34.4, 35.3, 35.7, 36.3, 36.9, 37.8, 38.2, 38.8, and 39.4 °2θ, ±0.2 °2θ, as determined on a diffractometer using Cu-Kα radiation. For example, the XRPD pattern for Form E can include 3, 4, 5, 6, 7, 8, 9, 10, 11, 12, 13, 14, 15, 16, 17, 18, 19, 20, 21, 22, 23, 24, 25, 26, 27, 28, 29, 30, or 31 such peaks.

Figure 9:
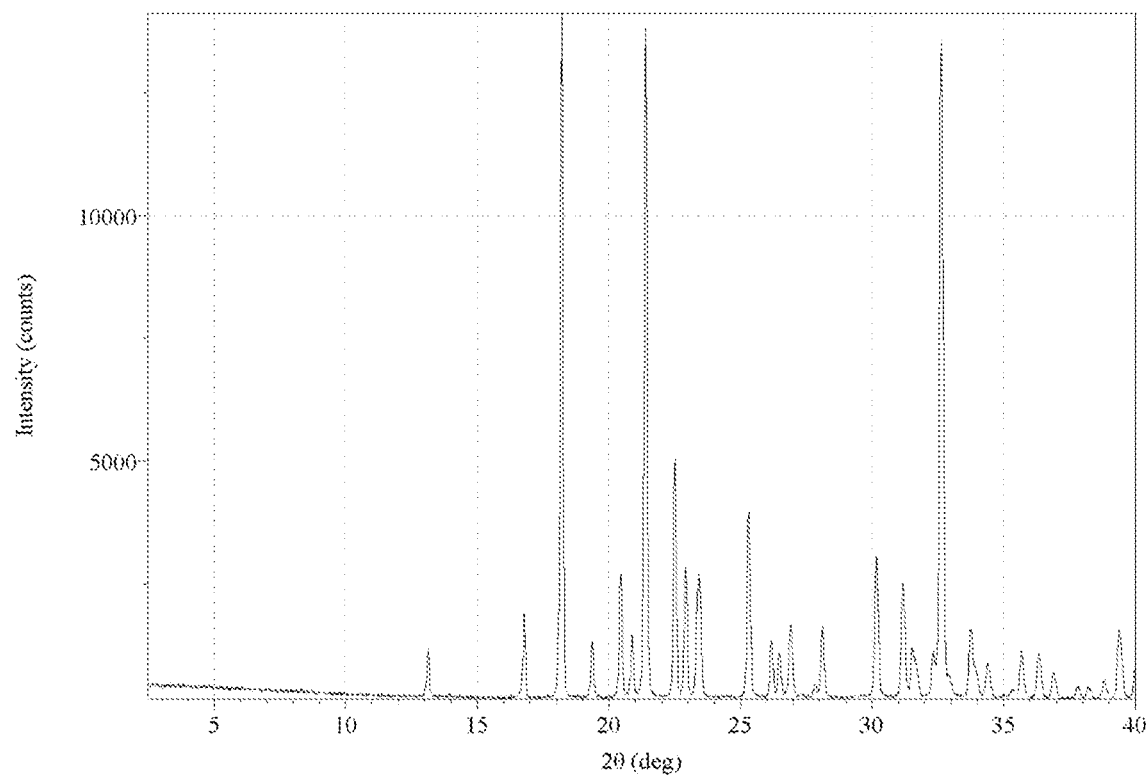
FIG. 9 shows an XRPD pattern collected with Cu-Kα radiation for L-glufosinate hydrochloride Form E.

In some embodiments, Form E is characterized by an XRPD pattern including at least six peaks selected from 16.8, 18.2, 20.5, 21.4, 22.5, 22.9, 23.4, 25.3, 30.2, and 31.2 °2θ, ±0.2 °2θ, as determined on a diffractometer using Cu-Kα radiation. In some embodiments, Form E is characterized by an XRPD pattern including peaks at least ten peaks selected from 16.8, 18.2, 20.5, 21.4, 22.5, 22.9, 23.4, 25.3, 30.2, and 31.2 °2θ, ±0.2 °2θ, as determined on a diffractometer using Cu-Kα radiation. In some embodiments, Form E is characterized by an XRPD pattern which is substantially in accordance with FIG. 9. As described below, Form E has been analyzed by ion chromatography which indicated a stoichiometric amount of L-glufosinate and chloride.

L-glufosinate hydrochloride Form E can be prepared according to methods described below. In some embodiments, preparation of L-glufosinate hydrochloride Form E includes combining L-glufosinate ammonium with water and hydrochloride acid; adding a solvent (e.g., methanol, ethanol, trifluoroethanol, isopropanol, acetone, dimethyl acetamide, or the like) to the resulting mixture; maintaining the mixture at a temperature ranging from about 20° C. to about 30° C. for a period of time ranging from 1 hour to 14 days; and isolating Form E from the mixture.

III. Compositions

Also described herein are compositions including the L-glufosinate described above. In some embodiments, the composition substantially includes L-glufosinate and an acceptable cationic or anionic salt forms such as the sodium, potassium, hydrochloride, sulfate, ammonium, or isopropylammonium salts. The composition may additionally comprise a mixture of L-glufosinate, PPO, and D-glufosinate, where L-glufosinate is the predominate compound. In other words, L-glufosinate is present in the composition in an amount greater than about 50 wt. % (e.g., greater than about 55 wt. %, greater than about 60 wt. %, greater than about 65 wt. %, greater than about 70 wt. %, greater than about 75 wt. %, greater than about 80 wt. %, greater than about 85 wt. %, greater than about 90 wt. %, or greater than about 95 wt. %).

The purified L-glufosinate described herein can be used in compositions useful for application to a field of crop plants for the prevention or control of weeds. The composition may be formulated as a liquid for spraying on a field. The L-glufosinate is provided in the composition in effective amounts. As used herein, effective amount means from about 10 grams active ingredient per hectare to about 1,500 grams active ingredient per hectare, e.g., from about 50 grams to about 400 grams or from about 100 grams to about 350 grams. In some embodiments, the active ingredient is L-glufosinate. For example, the amount of L-glufosinate in the composition can be about 10 grams, about 50 grams, about 100 grams, about 150 grams, about 200 grams, about 250 grams, about 300 grams, about 350 grams, about 400 grams, about 450 grams, about 500 grams, about 550 grams, about 600 grams, about 650 grams, about 700 grams, about 750 grams, about 800 grams, about 850 grams, about 900 grams, about 950 grams, about 1,000 grams, about 1,050 grams, about 1,100 grams, about 1,150 grams, about 1,200 grams, about 1,250 grams, about 1,300 grams, about 1,350 grams, about 1,400 grams, about 1,450 grams, or about 1,500 grams L-glufosinate per hectare.

The herbicidal compositions (including concentrates which require dilution prior to application to the plants) described herein contain L-glufosinate (i.e., the active ingredient), optionally some residual D-glufosinate and/or PPO, and one or more adjuvant components in liquid or solid form.

The compositions are prepared by admixing the active ingredient with one or more adjuvants, such as diluents, extenders, carriers, surfactants, organic solvents, humectants, or conditioning agents, to provide a composition in the form of a finely-divided particulate solid, pellet, solution, dispersion, or emulsion. Thus, the active ingredient can be used with an adjuvant, such as a finely-divided solid, a liquid of organic origin, water, a wetting agent, a dispersing agent, an emulsifying agent, or any suitable combination of these. From the viewpoint of economy and convenience, water is the preferred diluent. However, not all the compounds are resistant to hydrolysis and in some cases this may dictate the use of non-aqueous solvent media, as understood by those of skill in the art.

Optionally, one or more additional components can be added to the composition to produce a formulated herbicidal composition. Such formulated compositions can include L-glufosinate, carriers (e.g., diluents and/or solvents), and other components. The formulated composition includes an effective amount of L-glufosinate. Optionally, the L-glufosinate can be present in the form of L-glufosinate ammonium. The L-glufosinate ammonium can be present in an amount ranging from 10% to 30% by weight of the formulated composition. For example, the L-glufosinate ammonium can be present in an amount of 10%, 12%, 14%, 16%, 18%, 20%, 22%, 24%, 26%, 28%, or 30% by weight of the formulated composition. Optionally, the L-glufosinate ammonium is present in an amount of 12.25% or 24.5% by weight of the formulated composition.

In some examples, the formulated composition can include one or more surfactants. A suitable surfactant for use in the formulated composition includes sodium alkyl ether sulfate. The surfactant can be present in an amount from 10% to 40% by weight of the formulated composition. For example, the surfactant can be present in an amount of 10%, 12%, 14%, 16%, 18%, 20%, 22%, 24%, 26%, 28%, 30%, 32%, 34%, 36%, 38%, or 40% by weight of the formulated composition. Optionally, the sodium alkyl ether sulfate is present in an amount of 11.05%, 15.8%, 22.1%, or 31.6% by weight of the formulated composition.

The formulated composition can optionally include one or more solvents (e.g., organic solvents). Optionally, the solvent can be 1-methoxy-2-propanol, dipropylene glycol, ethylene glycol, and mixtures thereof. The one or more solvents can be present in an amount ranging from 0.5% to 20% by weight of the formulated composition. For example, the total amount of solvents in the composition can be present in an amount of 0.5% to 18%, 5% to 15%, or 7.5% to 10% by weight of the formulated composition.

Optionally, the solvent includes a combination of two solvents. For example, the solvents in the formulation can include 1-methoxy-2-propanol and dipropylene glycol. The 1-methoxy-2-propanol can be present, for example, in an amount of 0.5% to 2% by weight of the formulated composition. For example, the 1-methoxy-2-propanol can be present in the amount of 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, or 2.0% by weight of the formulated composition. Optionally, the 1-methoxy-2-propanol is present in an amount of 0.5% or 1.0% by weight of the formulated composition. The dipropylene glycol can be present in an amount of from 4% to 18% by weight of the formulated composition. For example, the dipropylene glycol can be present in an amount of 4%, 6%, 8%, 10%, 12%, 14%, 16%, or 18% by weight of the formulated composition. Optionally, the dipropylene glycol is present in an amount of 4.3% or 8.6% by weight of the formulated composition.

The formulated composition can also include one or more polysaccharide humectants. Examples of suitable polysaccharide humectants include, for example, alkyl polysaccharides, pentoses, high fructose corn syrup, sorbitol, and molasses. The polysaccharide humectant, such as alkyl polysaccharide, can be present in the formulated composition in an amount ranging from 4% to 20% by weight of the formulated composition. For example, the total amount of polysaccharide humectant in the composition can be from 4% to 18%, 4.5% to 15%, or 5% to 10% by weight of the formulated composition. In some examples, the total amount of polysaccharide humectant, such as the alkyl polysaccharide, present in the formulated composition can be 4%, 5%, 6%, 7%, 8%, 9%, 10%, 11%, 12%, 13%, 14%, 15%, 16%, 17%, or 18%. Optionally, the alkyl polysaccharide can be present in an amount of 3.2%, 4.9%, 6.2%, or 9.8% by weight of the formulated composition.

A diluent can also be included in the formulated composition. Suitable diluents include water and other aqueous components. Optionally, the diluents are present in an amount necessary to produce compositions ready for packaging or for use.

In one example, the formulated composition includes L-glufosinate ammonium in an amount of 12.25% by weight of the formulation; sodium alkyl ether sulfate in an amount of 31.6% by weight of the formulation; 1-methoxy-2-propanol in an amount of 1% by weight of the formulation; dipropylene glycol in an amount of 8.6% by weight of the formulation; alkyl polysaccharide in an amount of 9.8% by weight of the formulation; and water. In some embodiments, the formulated composition includes water in an amount of 36.75% by weight of the formulation.

In another example, the formulated composition includes L-glufosinate ammonium in an amount of 24.5% by weight of the formulation; sodium alkyl ether sulfate in an amount of 31.6% by weight of the formulation; 1-methoxy-2-propanol in an amount of 1% by weight of the formulation; dipropylene glycol in an amount of 8.6% by weight of the formulation; alkyl polysaccharide in an amount of 9.8% by weight of the formulation; and water. In some embodiments, the formulated composition includes water in an amount of 36.75% by weight of the formulation.

In another example, the formulated composition includes L-glufosinate ammonium in an amount of 12.25% by weight of the formulation; sodium alkyl ether sulfate in an amount of 15.8% by weight of the formulation; 1-methoxy-2-propanol in an amount of 0.5% by weight of the formulation; dipropylene glycol in an amount of 4.3% by weight of the formulation; alkyl polysaccharide in an amount of 4.9% by weight of the formulation; and water. In some embodiments, the formulated composition includes water in an amount of 62.25% by weight of the formulation.

In another example, the formulated composition includes L-glufosinate ammonium in an amount of 24.5% by weight of the formulation; sodium alkyl ether sulfate in an amount of 22.1% by weight of the formulation; 1-methoxy-2-propanol in an amount of 1% by weight of the formulation; alkyl polysaccharide in an amount of 6.2% by weight of the formulation; and water. In some embodiments, the formulated composition includes water in an amount of 46.2% by weight of the formulation.

In another example, the formulated composition includes L-glufosinate ammonium in an amount of 12.25% by weight of the formulation; sodium alkyl ether sulfate in an amount of 22.1% by weight of the formulation; 1-methoxy-2-propanol in an amount of 1% by weight of the formulation; alkyl polysaccharide in an amount of 6.2% by weight of the formulation; and water. In some embodiments, the formulated composition includes water in an amount of 58.45% by weight of the formulation.

In another example, the formulated composition includes L-glufosinate ammonium in an amount of 12.25% by weight of the formulation; sodium alkyl ether sulfate in an amount of 11.05% by weight of the formulation; 1-methoxy-2-propanol in an amount of 0.5% by weight of the formulation; alkyl polysaccharide in an amount of 3.1% by weight of the formulation; and water. In some embodiments, the formulated composition includes water in an amount of 73.1% by weight of the formulation.

The total amount of water may vary and will depend, in part, on the number and quantity of other components in the formulated compositions. Further components suitable for use in the formulated compositions provided herein are described in U.S. Pat. Nos. 4,692,181 and 5,258,358, both of which are incorporated by reference herein in their entireties.

The formulated compositions described herein, particularly liquids and soluble powders, can contain as further adjuvant components one or more surface-active agents in amounts sufficient to render a given composition readily dispersible in water or in oil. The incorporation of a surface-active agent into the compositions greatly enhances their efficacy. Surface-active agents, as used herein, include wetting agents, dispersing agents, suspending agents, and emulsifying agents. Anionic, cationic, and non-ionic agents can be used with equal facility.

Suitable wetting agents include alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters petroleum sulfonates, sulfonated vegetable oils, ditertiary acetylenic glycols, polyoxyethylene derivatives of alkylphenols (particularly isooctylphenol and nonylphenol), and polyoxyethylene derivatives of the mono-higher fatty acid esters of hexitol anhydrides (e.g., sorbitan). Exemplary dispersants include methyl cellulose, polyvinyl alcohol, sodium lignin sulfonates, polymeric alkyl naphthalene sulfonates, sodium naphthalene sulfonate, polymethylene bisnaphthalenesulfonate, and sodium N-methyl-N-(long chain acid) laurates.

Water-dispersible powder compositions can be made containing one or more active ingredients, an inert solid extender, and one or more wetting and dispersing agents. The inert solid extenders are usually of mineral origin, such as the natural clays, diatomaceous earth, and synthetic minerals derived from silica and the like. Examples of such extenders include kaolinites, attapulgite clay, and synthetic magnesium silicate. Water-dispersible powders described herein can optionally contain from about 5 to about 95 parts by weight of active ingredient (e.g., from about 15 to 30 parts by weight of active ingredient), from about 0.25 to 25 parts by weight of wetting agent, from about 0.25 to 25 parts by weight of dispersant, and from about 4.5 to about 94.5 parts by weight of inert solid extender, all parts being by weight of the total composition. Where required, from about 0.1 to 2.0 parts by weight of the solid inert extender can be replaced by a corrosion inhibitor or anti-foaming agent or both.

Aqueous suspensions can be prepared by dissolution or by mixing together and grinding an aqueous slurry of a water-insoluble active ingredient in the presence of a dispersing agent to obtain a concentrated slurry of very finely-divided particles. The resulting concentrated aqueous suspension is characterized by its extremely small particle size, so that when diluted and sprayed, coverage is very uniform.

Emulsifiable oils are usually solutions of active ingredients in water-immiscible or partially water-immiscible solvents together with a surface active agent. Suitable solvents for the active ingredient described herein include hydrocarbons and water-immiscible ethers, esters, or ketones. The emulsifiable oil compositions generally contain from about 5 to 95 parts active ingredient, about 1 to 50 parts surface active agent, and about 4 to 94 parts solvent, all parts being by weight based on the total weight of emulsifiable oil.

The formulated compositions described herein can also contain other additives, for example, fertilizers, phytotoxicants and plant growth regulators, pesticides, and the like used as adjuvants or in combination with any of the above-described adjuvants. The formulated compositions described herein can also be admixed with the other materials, e.g., fertilizers, other phytotoxicants, etc., and applied in a single application.

In each of the formulation types described herein, e.g., liquid and solid formulations, the concentration of the active ingredients can be the same.

In some embodiments, the composition can include 2-oxoglutarate as a major component. 2-oxoglutarate is an important dicarboxylic acid and one of the key intermediates in the tricarboxylic acid cycle and amino acid metabolism. 2-oxoglutarate can be isolated from the reaction mixture by methods such as that set forth in French Patent No. 07199, herein incorporated by reference. The 2-oxoglutarate composition can be formulated with pharmaceutical excipients and carriers, food additives, or components used to form biomaterials. The 2-oxoglutarate composition can be used in a variety of applications, including in synthesizing pharmaceutical agents, food additives, and biomaterials, as described in Li et al., *Bioprocess Biosyst Eng*, 39:967-976 (2016).

It is recognized that the formulated herbicidal compositions can be used in combination with other herbicides. The herbicidal compositions described herein are often applied in conjunction with one or more other herbicides to control a wider variety of undesirable vegetation. When used in conjunction with other herbicides, the presently claimed compounds can be formulated with the other herbicide or herbicides, tank mixed with the other herbicide or herbicides, or applied sequentially with the other herbicide or herbicides. Some of the herbicides that can be employed in conjunction with the formulated herbicidal compositions described herein include: amide herbicides such as allidochlor, 6-arylpicolinates, beflubutamid, benzadox, benzipram, bromobutide, cafenstrole, CDEA, chlorthiamid, 6-cyclopropylpicolinates, cyprazole, dimethenamid, dimethenamid-P, diphenamid, epronaz, etnipromid, fentrazamide, flupoxam, fomesafen, halo safen, isocarbamid, isoxaben, napropamide, naptalam, pethoxamid, propyzamide, quinonamid and tebutam; anilide herbicides such as chloranocryl, cisanilide, clomeprop, cypromid, diflufenican, etobenzanid, fenasulam, flufenacet, flufenican, mefenacet, mefluidide, metamifop, monalide, naproanilide, pentanochlor, picolinafen and propanil; arylalanine herbicides such as benzoylprop, flamprop and flamprop-M; chloroacetanilide herbicides such as acetochlor, alachlor, butachlor, butenachlor, delachlor, diethatyl, dimethachlor, metazachlor, metolachlor, S-metolachlor, pretilachlor, propachlor, propisochlor, prynachlor, terbuchlor, thenylchlor and xylachlor; sulfonanilide herbicides such as benzofluor, perfluidone, pyrimisulfan and profluazol; sulfonamide herbicides such as asulam, carbasulam, fenasulam and oryzalin; antibiotic herbicides such as bilanafos; benzoic acid herbicides such as chloramben, dicamba, 2,3,6-TBA and tricamba; pyrimidinyloxybenzoic acid herbicides such as bispyribac and pyriminobac; pyrimidinylthiobenzoic acid herbicides such as pyrithiobac; phthalic acid herbicides such as chlorthal; picolinic acid herbicides such as aminopyralid, clopyralid and picloram; quinolinecarboxylic acid herbicides such as quinclorac and quinmerac; arsenical herbicides such as cacodylic acid, CMA, DSMA, hexaflurate, MAA, MAMA, MSMA, potassium arsenite and sodium arsenite; benzoylcyclohexanedione herbicides such as mesotrione, sulcotrione, tefuryltrione and tembotrione; benzofuranyl alkylsulfonate herbicides such as benfuresate and ethofumesate; carbamate herbicides such as asulam, carboxazole chlorprocarb, dichlormate, fenasulam, karbutilate and terbucarb; carbanilate herbicides such as barban, BCPC, carbasulam, carbetamide, CEPC, chlorbufam, chlorpropham, CPPC, desmedipham, phenisopham, phenmedipham, phenmedipham-ethyl, propham and swep; cyclohexene oxime herbicides such as alloxydim, butroxydim, clethodim, cloproxydim, cycloxydim, profoxydim, sethoxydim, tepraloxydim and tralkoxydim; cyclopropylisoxazole herbicides such as isoxachlortole and isoxaflutole; dicarboximide herbicides such as benzfendizone, cinidon-ethyl, flumezin, flumiclorac, flumioxazin and flumipropyn; dinitroaniline herbicides such as benfluralin, butralin, dinitramine, ethalfluralin, fluchloralin, isopropalin, methalpropalin, nitralin, oryzalin, pendimethalin, prodiamine, profluralin and trifluralin; dinitrophenol herbicides such as dinofenate, dinoprop, dinosam, dinoseb, dinoterb, DNOC, etinofen and medinoterb; diphenyl ether herbicides such as ethoxyfen; nitrophenyl ether herbicides such as acifluorfen, aclonifen, bifenox, chlomethoxyfen, chlomitrofen, etnipromid, fluorodifen, fluoroglycofen, fluoronitrofen, fomesafen, furyloxyfen, halosafen, lactofen, nitrofen, nitrofluorfen and oxyfluorfen; dithiocarbamate herbicides such as dazomet and metam; halogenated aliphatic herbicides such as alorac, chloropon, dalapon, flupropanate, hexachloroacetone, iodomethane, methyl bromide, monochloroacetic acid, SMA and TCA; imidazolinone herbicides such as imazamethabenz, imazamox, imazapic, imazapyr, imazaquin and imazethapyr; inorganic herbicides such as ammonium sulfamate, borax, calcium chlorate, copper sulfate, ferrous sulfate, potassium azide, potassium cyanate, sodium azide, sodium chlorate and sulfuric acid; nitrile herbicides such as bromobonil, bromoxynil, chloroxynil, dichlobenil, iodobonil, ioxynil and pyraclonil; organophosphorus herbicides such as amiprofos-methyl, anilofos, bensulide, bilanafos, butamifos, 2,4-DEP, DMPA, EBEP, fosamine, glyphosate and piperophos; phenoxy herbicides such as bromofenoxim, clomeprop, 2,4-DEB, 2,4-DEP, difenopenten, disul, erbon, etnipromid, fenteracol and trifopsime; phenoxyacetic herbicides such as 4-CPA, 2,4-D, 3,4-DA, MCPA, MCPA-thioethyl and 2,4,5-T; phenoxybutyric herbicides such as 4-CPB, 2,4-DB, 3,4-DB, MCPB and 2,4,5-TB; phenoxypropionic herbicides such as cloprop, 4-CPP, dichlorprop, dichlorprop-P, 3,4-DP, fenoprop, mecoprop and mecoprop-P; aryloxyphenoxypropionic herbicides such as chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, metamifop, propaquizafop, quizalofop, quizalofop-P and trifop; phenylenediamine herbicides such as dinitramine and prodiamine; pyrazolyl herbicides such as benzofenap, pyrazolynate, pyrasulfotole, pyrazoxyfen, pyroxasulfone and topramezone; pyrazolylphenyl herbicides such as fluazolate and pyraflufen; pyridazine herbicides such as credazine, pyridafol and pyridate; pyridazinone herbicides such as brompyrazon, chloridazon, dimidazon, flufenpyr, metflurazon, norflurazon, oxapyrazon and pydanon; pyridine herbicides such as aminopyralid, cliodinate, clopyralid, dithiopyr, fluroxypyr, haloxydine, picloram, picolinafen, pyriclor, thiazopyr and triclopyr; pyrimidinediamine herbicides such as iprymidam and tioclorim; quaternary ammonium herbicides such as cyperquat, diethamquat, difenzoquat, diquat, morfamquat and paraquat; thiocarbamate herbicides such as butylate, cycloate, di-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate and vemolate; thiocarbonate herbicides such as dimexano, EXD and proxan; thiourea herbicides such as methiuron; triazine herbicides such as dipropetryn, triaziflam and trihydroxytriazine; chlorotriazine herbicides such as atrazine, chlorazine, cyanazine, cyprazine, eglinazine, ipazine, mesoprazine, procyazine, proglinazine, propazine, sebuthylazine, simazine, terbuthylazine and trietazine; methoxytriazine herbicides such as atraton, methometon, prometon, secbumeton, simeton and terbumeton; methylthiotriazine herbicides such as ametryn, aziprotryne, cyanatryn, desmetryn, dimethametryn, methoprotryne, prometryn, simetryn and terbutryn; triazinone herbicides such as ametridione, amibuzin, hexazinone, isomethiozin, metamitron and metribuzin; triazole herbicides such as amitrole, cafenstrole, epronaz and flupoxam; triazolone herbicides such as amicarbazone, bencarbazone, carfentrazone, flucarbazone, propoxycarbazone, sulfentrazone and thiencarbazone-methyl; triazolopyrimidine herbicides such as cloransulam, diclosulam, florasulam, flumetsulam, metosulam, penoxsulam and pyroxsulam; uracil herbicides such as butafenacil, bromacil, flupropacil, isocil, lenacil and terbacil; 3-phenyluracils; urea herbicides such as benzthiazuron, cumyluron, cycluron, dichloralurea, diflufenzopyr, isonoruron, isouron, methabenzthiazuron, monisouron and noruron; phenylurea herbicides such as anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluron, phenobenzuron, siduron, tetrafluron and thidiazuron; pyrimidinylsulfonylurea herbicides such as amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, nicosulfuron, orthosulfamuron, oxasulfuron, primisulfuron, pyrazosulfuron, rimsulfuron, sulfometuron, sulfosulfuron and trifloxysulfuron; triazinylsulfonylurea herbicides such as chlorsulfuron, cinosulfuron, ethametsulfuron, iodosulfuron, metsulfuron, prosulfuron, thifensulfuron, triasulfuron, tribenuron, triflusulfuron and tritosulfuron; thiadiazolylurea herbicides such as buthiuron, ethidimuron, tebuthiuron, thiazafluron and thidiazuron; and unclassified herbicides such as acrolein, allyl alcohol, aminocyclopyrachlor, azafenidin, benazolin, bentazone, benzobicyclon, buthidazole, calcium cyanamide, cambendichlor, chlorfenac, chlorfenprop, chlorflurazole, chlorflurenol, cinmethylin, clomazone, CPMF, cresol, orthodichlorobenzene, dimepiperate, endothal, fluoromidine, fluridone, flurochloridone, flurtamone, fluthiacet, indanofan, methazole, methyl isothiocyanate, nipyraclofen, OCH, oxadiargyl, oxadiazon, oxaziclomefone, pentachlorophenol, pentoxazone, phenylmercury acetate, pinoxaden, prosulfalin, pyribenzoxim, pyriftalid, quinoclamine, rhodethanil, sulglycapin, thidiazimin, tridiphane, trimeturon, tripropindan and tritac. The herbicidal compositions of the present invention can, further, be used in conjunction with glyphosate, dicamba, or 2,4-D on glyphosate-tolerant, dicamba-tolerant, or 2,4-D-tolerant crops. It is generally preferred to use the compositions described herein in combination with herbicides that are selective for the crop being treated and which complement the spectrum of weeds controlled by these compositions at the application rate employed. It is further generally preferred to apply the compositions described herein and other complementary herbicides at the same time, either as a combination formulation or as a tank mix.

IV. Methods of Using

The compositions described herein can be used in methods for selectively controlling weeds in a field or any other area, including, for example, a railway, lawn, golf course, and others where the control of weeds is desired. Optionally, the field or other area can contain a crop of planted seeds or crops that are resistant to glufosinate. The methods can include applying an effective amount of a composition comprising L-glufosinate as described herein to the field.

The compositions described herein are useful for application to a field of crop plants for the prevention or control of weeds. The compositions may be formulated as a liquid for spraying on a field. The L-glufosinate is provided in the compositions in effective amounts. As used herein, effective amount means from about 10 grams active ingredient per hectare to about 1,500 grams active ingredient per hectare, e.g., from about 50 grams to about 400 grams or from about 100 grams to about 350 grams. In some embodiments, the active ingredient is L-glufosinate. For example, the amount of L-glufosinate in the composition can be about 10 grams, about 50 grams, about 100 grams, about 150 grams, about 200 grams, about 250 grams, about 300 grams, about 350 grams, about 400 grams, about 500 grams, about 550 grams, about 600 grams, about 650 grams, about 700 grams, about 750 grams, about 800 grams, about 850 grams, about 900 grams, about 950 grams, about 1,000 grams, about 1,050 grams, about 1,100 grams, about 1,150 grams, about 1,200 grams, about 1,250 grams, about 1,300 grams, about 1,350 grams, about 1,400 grams, about 1,450 grams, or about 1,500 grams L-glufosinate per hectare.

V. Exemplary Embodiments

Non-limiting embodiments include:

1. A method for purifying L-glufosinate from a composition comprising L-glufosinate and glutamate, by converting the glutamate to pyroglutamate to facilitate isolation of L-glufosinate, said method comprising:
   reacting an L-glufosinate composition comprising L-glufosinate and glutamate at an elevated temperature for a sufficient period of time to convert the majority of glutamate to pyroglutamate; and,
   isolating L-glufosinate from the pyroglutamate and other components of the composition to obtain a composition of substantially purified L-glufosinate (90% or greater of the sum of L-glufosinate, glutamate, and pyroglutamate).

2. The method of embodiment 1, wherein a portion of the initial glutamate in the composition is first separated from the L-glufosinate by crystallization and filtration followed by conversion of glutamate to pyroglutamate.

3. The method of embodiment 2, wherein the separated glutamate is recycled to the enzymatic reaction combining a D-amino acid oxidase and a transaminase.

4. The method of embodiment 1, wherein the isolation of L-glufosinate from pyroglutamate is performed using ion exchange.

5. The method of embodiment 4, further comprising contacting the L-glufosinate isolated using ion exchange with methanol to precipitate inorganic salts.

6. The method of embodiment 1, wherein the isolation of L-glufosinate from pyroglutamate is performed using size exclusion chromatography.

7. The method of embodiment 1, wherein the elevated temperature comprises a temperature of from 120° C. to 180° C.

8. The method of embodiment 1, wherein the sufficient period of time comprises at least 2 hours.

9. The method of embodiment 8, wherein the sufficient period of time comprises from 2 hours to 18 hours.

10. A method for purifying L-glufosinate, comprising converting excess glutamate to pyroglutamate to facilitate isolation of L-glufosinate, said method comprising:
    reacting an L-glufosinate composition comprising L-glufosinate and glutamate in the presence of a glutaminyl-peptide cyclotransferase for a sufficient period of time to convert the majority of glutamate to pyroglutamate; and,
    isolating L-glufosinate from the pyroglutamate and other components of the composition to obtain a composition of substantially purified L-glufosinate (90% or greater of the sum of L-glufosinate, glutamate, and pyroglutamate).

11. The method of embodiment 10, wherein the sufficient period of time comprises at least 2 hours.

12. The method of embodiment 11, wherein the sufficient period of time comprises from 2 hours to 18 hours.

13. The method of embodiment 10, wherein the isolation of L-glufosinate from pyroglutamate is performed using ion exchange.

14. The method of embodiment 13, further comprising contacting the L-glufosinate isolated using ion exchange with methanol to precipitate inorganic salts.

15. The method of embodiment 10, wherein the isolation of L-glufosinate from pyroglutamate is performed using size exclusion chromatography.

16. A method for obtaining purified succinic acid as a by-product from a method of making L-glufosinate, said method comprising:
    aminating PPO to L-glufosinate by a transaminase (TA) enzyme, using an amine group from glutamic acid present in the composition, thereby generating a 2-oxoglutaric acid by-product;

reacting an L-glufosinate composition comprising L-glufosinate, glutamate, and 2-oxoglutaric acid at an elevated temperature for a sufficient period of time to convert the majority of glutamate to pyroglutamate;

isolating 2-oxoglutaric acid from the composition by ion exchange to obtain a composition of substantially purified 2-oxoglutaric acid; and contacting the substantially purified 2-oxoglutaric acid with hydrogen peroxide to obtain a composition of substantially purified succinic acid.

17. The method of embodiment 10 or 16, wherein a portion of the initial glutamate in the composition is first separated from the L-glufosinate by crystallization and filtration followed by conversion of glutamate to pyroglutamate.

18. The method of embodiment 17, wherein acid is added to crystallize glutamate.

19. The method of embodiment 18, wherein said acid is selected from the group consisting of sulfuric acid, hydrochloric acid, phosphoric acid, formic acid, and acetic acid.

20. The method of embodiment 18, wherein the composition is heated to an elevated temperature before, during, or after the addition of said acid.

21. The method of embodiment 20, wherein said elevated temperature ranges from about 35° C. to about 90° C.

22. The method of embodiment 20, wherein said elevated temperature ranges from about 40° C. to about 80° C.

23. The method of embodiment 20, wherein said elevated temperature ranges from about 50° C. to about 70° C.

24. The method of embodiment 20, wherein the composition is cooled to a temperature below 25° C. after heating.

25. The method of embodiment 24, wherein said temperature ranges from about −5° C. to about 15° C.

26. The method of embodiment 24, wherein said temperature ranges from about 0° C. to about 10° C.

27. The method of embodiment 17, wherein the separated glutamate is recycled to the enzymatic reaction combining a D-amino acid oxidase and a transaminase.

28. The method of embodiment 1 or 16, wherein the elevated temperature comprises a temperature of from 120° C. to 180° C.

29. The method of embodiment 10 or 16, wherein the sufficient period of time comprises at least 2 hours.

30. The method of embodiment 29, wherein the sufficient period of time comprises from 2 hours to 18 hours.

31. The method of embodiment 1 or 16, wherein the composition is adjusted to a pH<7 by adding an acid prior to heating to elevated temperature.

32. The method of embodiment 31, wherein said acid is selected from the group consisting of sulfuric acid, hydrochloric acid, and phosphoric acid.

33. The method of embodiment 31, wherein the pH is adjusted to from about pH 1 to about pH 6.

34. The method of embodiment 31, wherein the pH is adjusted to from about pH 2 to about pH 5.

35. The method of embodiment 31, wherein the pH is adjusted to from about pH 3 to about pH 4.

36. The method of any one of embodiments 1, 10, and 16, wherein a base is added to said composition prior to the ion exchange step.

37. A method for obtaining purified succinic acid as a by-product from a method of making L-glufosinate, said method comprising:

aminating PPO to L-glufosinate by a transaminase (TA) enzyme, using an amine group from glutamic acid present in the composition, thereby generating a 2-oxoglutaric acid by-product;

reacting an L-glufosinate composition comprising L-glufosinate, glutamate, and 2-oxoglutaric acid at an elevated temperature for a sufficient period of time to convert the majority of glutamate to pyroglutamate;

isolating 2-oxoglutaric acid from the composition by size exclusion chromatography to obtain a composition of substantially purified 2-oxoglutaric acid; and contacting the substantially purified 2-oxoglutaric acid with hydrogen peroxide to obtain a composition of substantially purified succinic acid.

38. The method of embodiment 37, wherein a base is added to said composition prior to the size exclusion step.

39. The method of embodiment 36 or embodiment 38, wherein said base is selected from the group consisting of sodium hydroxide, potassium hydroxide, and ammonium hydroxide.

40. The method of embodiment 36 or embodiment 38, wherein the pH of said composition is adjusted from about pH 2 to about pH 8.

41. The method of embodiment 36 or embodiment 38, wherein the pH of said composition is adjusted from about pH 3 to about pH 7.

42. The method of embodiment 36 or embodiment 38, wherein the pH of said composition is adjusted from about pH 4 to about pH 6.

43. The method of embodiment 36 or embodiment 38, wherein the resulting composition is processed through a membrane separator.

44. The method of embodiment 36 or embodiment 38, wherein said composition is cooled to a temperature below about 25° C., held for a sufficient period of time, and then filtered.

45. The method of embodiment 44, wherein said temperature is no more than about 20° C.

46. The method of embodiment 44, wherein said temperature is no more than about 10° C.

47. The method of embodiment 44, wherein said temperature is no more than about 5° C.

48. The method of embodiment 44, wherein said temperature is no more than about 0° C.

49. The method of embodiment 44, wherein said sufficient period of time comprises at least 1 hour.

50. The method of embodiment 49, wherein said sufficient period of time comprises from 1 hour to 24 hours.

51. The method of any one of embodiments 1, 10, and 16, wherein said ion exchange is performed by contacting the composition with either an anion exchange resin or a cation exchange resin.

52. The method of embodiment 51, wherein said ion exchange resin is comprised of a polymer-based, cross-linked substrate made from a monovinyl monomer and a polyvinyl crosslinking agent.

53. The method of embodiment 52, wherein said monovinyl monomer is styrene and the polyvinyl crosslinking agent is divinylbenzene.

54. The method of embodiment 52, wherein the porosity of said ion exchange resin is microporous, mesoporous, or macroporous.

55. The method of embodiment 52, wherein the said ion exchange resin is a gel type resin.

56. The method of embodiment 52, wherein the said ion exchange resin has a median particle diameter from 10 microns to 2000 microns.

57. The method of embodiment 52, wherein the said ion exchange resin has a median particle diameter from 100 microns to 1000 microns.

58. The method of embodiment 52, wherein the ion exchange resin is in the form of a bead with a uniform particle size distribution.
59. The method of any one or more of embodiments 51 through 58, wherein the said ion exchange resin is a strong anion exchange resin.
60. The method of embodiment 59, wherein the said anion exchange resin is selected from the group consisting of DOWEX™ MARATHON™ A, DOWEX™ MONOSPHERE™ 550A, DOWEX® MONOSPHERE™ MSA, and DOWEX™ XUR-1525-L09-046, an experimental geltype, uniform particle size in the 300 micron range, strong base anion exchange resin, and Type I (trimethylamine quaternary ammonium, in the chloride form).
61. The method of embodiment 59, wherein said anion exchange resin is used in hydroxy form.
62. The method of any one of embodiments 1, 10, and 16, wherein said ion exchange process is conducted in a pH range from 3 to 8.
63. The method of any one of embodiments 1, 10, and 16, wherein said ion exchange process is conducted in a pH range of 4 to 8.
64. The method of any one of embodiments 1, 10, and 16, wherein said ion exchange process is conducted in a pH range of 5 to 8.
65. The method of any one of embodiments 1, 10, and 16, wherein said ion exchange process is conducted in a pH range of 6 to 7.
66. The method of any one of embodiments 1, 10, and 16, wherein the ion exchange process is conducted at a temperature in the range of from 20° C. to 70° C.
67. The method of any one of embodiments 1, 10, and 16, wherein the ion exchange process is conducted in a temperature in the range of from 30° C. to 60° C.
68. The method of any one of embodiments 1, 10, and 16, wherein the ion exchange process is conducted in a temperature in the range of from 40° C. to 50° C.
69. The method of any one or more of embodiments 51 through 58, wherein said ion exchange resin is a strong cation exchange resin.
70. The method of embodiment 69, wherein said cation exchange resin is used in a hydrogen form.
71. The method of embodiment 69, wherein said cation exchange resin is selected from the group consisting of DOWEX™ 50WX8, DOWEX™ MONOSPHERE™ 99 K/350, DOWEX™ MONOSPHERE™ C, and DOWEX™ MARATHON™ MSC.
72. The method of embodiment 69, wherein said ion exchange process is conducted in a pH range from 0.4 to 7.
73. The method of embodiment 69, wherein said exchange process is conducted in a pH range of 0.6 to 7.
74. The method of embodiment 69, wherein the ion exchange process is conducted in a pH range of 1 to 6.
75. The method of embodiment 69, wherein the ion exchange process is conducted in a pH range of 1 to 4.5.
76. The method of embodiment 69, wherein the ion exchange process is conducted at a temperature in the range of from 20° C. to 70° C.
77. The method of embodiment 69, wherein the ion exchange process is conducted at a temperature in the range of from 30° C. to 60° C.
78. The method of embodiment 69, wherein the ion exchange process is conducted at a temperature in the range of from 40° C. to 50° C.
79. The method of any one of embodiments 1, 10, and 16, wherein prior to said ion exchange, the composition is concentrated or decolorized or both.
80. The method of embodiment 79, wherein the composition is decolorized with activated charcoal or activated carbon.
81. The method of embodiment 79, wherein the composition is decolorized with a polymeric material.
82. The method of any one of embodiments 1, 10, and 16, wherein the composition and ion exchange resin are contacted in batch mode.
83. The method of any one of embodiments 1, 10, and 16, wherein the composition and ion exchange resin are contacted in flow mode.
84. The method of embodiment 83, wherein said flow mode uses the technique of simulated moving bed chromatography.
85. The method of embodiment 84, wherein the composition is subjected to a pretreatment adsorption step to remove one or more components of the composition prior to simulated moving bed chromatography.
86. A method of regenerating the resin used in the method of any one of embodiments 1, 10, and 16, wherein the resin is contacted with a composition comprising one or more of an acid, a base, water, and an inorganic salt.
87. The method of embodiment 86, wherein the base is sodium hydroxide.
88. The method of embodiment 86, wherein the inorganic salt is selected from a group comprised of sodium chloride, sodium sulfate, ammonium chloride, and ammonium sulfate.
89. The method of embodiment 86, wherein the acid is sulfuric acid.
90. The method of embodiment 86, wherein the composition comprises not more than 0.5 M sodium hydroxide and not more than 1.5 M sodium chloride.
91. The method of embodiment 86, wherein the composition comprises not more than 0.1 M sodium hydroxide and not more than 1.5 M sodium chloride.
92. The method of embodiment 86, wherein the composition comprises not more than 0.5 M sodium chloride.
93. The method of embodiment 86, wherein the composition comprises not more than 0.5 M sodium sulfate.
94. The method of embodiment 86, wherein the said regeneration produces a solution of substantially purified 2-oxoglutaric acid.
95. The method of embodiment 94, wherein the solution of substantially purified 2-oxoglutaric acid is contacted with hydrogen peroxide to produce substantially purified succinic acid.
96. The method of any one of embodiments 1, 10, and 16, wherein the substantially purified L-glufosinate is reduced to a concentrate that can be formulated directly into an herbicidal product.
97. The method of any one of embodiments 1, 10, and 16, wherein said substantially purified L-glufosinate is concentrated past the point where crystallization or precipitation occurs and the resulting solids are filtered and dried.
98. The method of embodiment 97, wherein a solvent is added before, during or after said concentration.
99. The method of embodiment 98, wherein the solvent is chosen from a group comprised of acetone, methanol, ethanol, 1-propanol, 2-propanol, acetonitrile, tetrahydrofuran, 1-methyl-2-propanol, 1,2-propanediol, 1,2-ethanediol, triethylamine, isopropylamine, and ammonium hydroxide.
100. The method of any one of embodiments 1, 10, and 16, wherein the substantially purified L-glufosinate is concentrated to produce a dry solid.
101. The method of any one of embodiments 1, 10, and 16, wherein the substantially purified L-glufosinate is spray dried.

102. The method of any one of embodiments 1, 10, and 16, wherein the substantially purified L-glufosinate is partially concentrated prior to spray drying.

103. The method of any one of embodiments 1, 10, and 16, wherein formulation ingredients are mixed with the substantially purified L-glufosinate prior to spray drying.

104. A method for purifying L-glufosinate from a composition comprising L-glufosinate and glutamate, by converting the glutamate to pyroglutamate to facilitate isolation of L-glufosinate, said method comprising:
  adding sulfuric acid to bring the composition to pH 3.7 to crystallize glutamate and removing solid glutamate from the composition;
  reacting the composition at an elevated temperature for a sufficient period of time to convert the majority of remaining glutamate to pyroglutamate;
  reducing the volume of the composition;
  adding sodium hydroxide until the pH of the composition is between pH 6 and pH 7;
  cooling the composition to a temperature between 5° C. and the freezing point of the mixture (approximately −10 to −20° C.) during which sodium sulfate precipitates;
  filtering the sodium sulfate crystals from the composition;
  contacting the composition with an ion exchange resin to remove pyroglutamic acid and obtaining a composition of substantially purified L-glufosinate; and,
  reducing the volume of the composition of the substantially purified L-glufosinate.

105. The method of embodiment 104, wherein the volume of the composition of the substantially purified L-glufosinate is reduced to a solid.

106. The method of embodiment 104, wherein the volume of the composition of the substantially purified L-glufosinate is concentrated to an amount suitable for use in an herbicidal formula.

107. The method of embodiment 104, wherein said solid glutamate is removed by filtration or centrifugation from the composition.

108. The method of embodiment 104, wherein the volume of the composition is reduced by vacuum distillation, membrane separation, evaporation thin film evaporation, or wiped film evaporation.

109. The method of embodiment 104, wherein said sodium sulfate crystals are filtered from the composition by filtration or centrifugation.

110. L-Glufosinate ammonium Form A, which is characterized by an X-ray powder diffraction (XRPD) pattern comprises at least three peaks selected from 10.1, 10.8, 16.8, 17.2, 18.3, 20.0, 20.2, 21.2, 21.5, 24.1, 24.3, 25.1, 25.6, 26.9, 28.6, 29.0, 29.7, 29.9, 31.9, 33.4, 33.7, 34.5, 34.9, 35.4, 35.7, 36.1, 36.7, 37.1, 37.5, 38.2, and 39.8 °2θ, ±0.2 °2θ, as determined on a diffractometer using Cu-Kα radiation.

111. L-Glufosinate ammonium Form A according to embodiment 110, wherein the XRPD pattern comprises at least six peaks selected from 10.1, 16.8, 18.3, 21.2, 24.1, 24.3, 25.6, 26.9, 28.6, 29.0, and 34.5 °2θ, ±0.2 °2θ.

112. L-Glufosinate ammonium Form A according to embodiment 110, wherein the XRPD pattern comprises at least ten peaks selected from 10.1, 16.8, 18.3, 21.2, 24.1, 24.3, 25.6, 26.9, 28.6, 29.0, and 34.5 °2θ, ±0.2 °2θ.

113. L-Glufosinate ammonium Form A according to embodiment 110, wherein the XRPD pattern is substantially in accordance with FIG. 1.

114. L-Glufosinate Form B, which is characterized by an X-ray powder diffraction (XRPD) pattern comprises at least three peaks selected from 10.0, 11.4, 12.5, 16.5, 17.4, 18.1, 19.6, 20.0, 21.8, 22.9, 23.6, 24.0, 25.1, 25.5, 26.1, 26.3, 26.4, 27.9, 28.2, 28.4, 28.7, 29.2, 30.2, 30.9, 31.6, 31.7, 32.7, 33.0, 33.3, 34.3, 35.2, 36.7, 37.2, 37.4, 37.8, 38.3, 38.7, and 39.3 °2θ, ±0.2 °2θ, as determined on a diffractometer using Cu-Kα radiation.

115. L-Glufosinate Form B according to embodiment 114, wherein the XRPD pattern comprises at least six peaks selected from 10.0, 12.5, 16.5, 17.4, 18.1, 19.6, 20.0, 21.8, 22.9, 23.6, 24.0, 25.5, 26.3, 26.4, 29.2, 34.3, 35.2, and 37.4 °2θ, ±0.2 °2θ.

116. L-Glufosinate Form B according to embodiment 114, wherein the XRPD pattern comprises at least ten peaks selected from 10.0, 12.5, 16.5, 17.4, 18.1, 19.6, 20.0, 21.8, 22.9, 23.6, 24.0, 25.5, 26.3, 26.4, 29.2, 34.3, 35.2, and 37.4 °2θ, ±0.2 °2θ.

117. L-Glufosinate Form B according to embodiment 114, wherein the XRPD pattern is substantially in accordance with FIG. 3.

118. L-Glufosinate ammonium Form C, which is characterized by an X-ray powder diffraction (XRPD) pattern comprises at least three peaks selected from 9.1, 10.9, 16.1, 16.8, 17.3, 18.3, 20.1, 21.4, 21.8, 22.4, 22.7, 24.1, 24.9, 25.4, 25.6, 26.1, 26.6, 27.7, 28.3, 28.9, 30.8, 31.9, 32.6, 33.6, 33.9, 35.1, 36.6, 37.1, 37.5, 38.3, 38.9, and 39.7 °2θ, ±0.2 °2θ, as determined on a diffractometer using Cu-Kα radiation.

119. L-Glufosinate ammonium Form C according to embodiment 118, wherein the XRPD pattern comprises at least six peaks selected from 9.1, 16.1, 16.8, 17.3, 21.8, 24.1, 24.9, 25.6, 26.1, 28.3, and 28.9 °2θ, ±0.2 °2θ.

120. L-Glufosinate ammonium Form C according to embodiment 118, wherein the XRPD pattern comprises at least ten peaks selected from 9.1, 16.1, 16.8, 17.3, 21.8, 24.1, 24.9, 25.6, 26.1, 28.3, and 28.9 °2θ, ±0.2 °2θ.

121. L-Glufosinate ammonium Form C according to embodiment 118, wherein the XRPD pattern is substantially in accordance with FIG. 5.

122. L-Glufosinate Form D, which is characterized by an X-ray powder diffraction (XRPD) pattern comprises at least three peaks selected from 9.1, 11.6, 13.1, 14.1, 14.4, 16.2, 17.7, 18.2, 18.9, 19.3, 19.7, 21.2, 21.8, 22.4, 23.2, 23.5, 25.3, 25.8, 26.2, 27.2, 28.6, 29.1, 30.0, 30.6, 31.1, 31.6, 32.7, 33.5, 34.4, 34.7, 35.4, 35.9, 36.4, and 37.4 °2θ, ±0.2 °2θ, as determined on a diffractometer using Cu-Kα radiation.

123. L-Glufosinate Form D according to embodiment 122, wherein the XRPD pattern comprises at least six peaks selected from 9.1, 17.7, 18.2, 18.9, 22.4, 23.2, 23.5, 26.2, 33.5, and 36.4 °2θ, ±0.2 °2θ.

124. L-Glufosinate Form D according to embodiment 122, wherein the XRPD pattern comprises peaks at 9.1, 17.7, 18.2, 18.9, 22.4, 23.2, 23.5, 26.2, 33.5, and 36.4 °2θ, ±0.2 °2θ.

125. L-Glufosinate Form D according to embodiment 122, wherein the XRPD pattern is substantially in accordance with FIG. 7.

126. L-Glufosinate hydrochloride Form E, which is characterized by an X-ray powder diffraction (XRPD) pattern comprises at least three peaks selected from 13.1, 16.8, 18.2, 19.4, 20.5, 20.9, 21.4, 22.5, 23.4, 25.3, 26.2, 26.5, 26.9, 27.8, 28.1, 30.2, 31.2, 31.5, 32.3, 33.8, 34.4, 35.3, 35.7, 36.3, 36.9, 37.8, 38.2, 38.8, and 39.4 °2θ, ±0.2 °2θ, as determined on a diffractometer using Cu-Kα radiation.

127. L-Glufosinate hydrochloride Form E according to embodiment 126, wherein the XRPD pattern comprises at least six peaks selected from 16.8, 18.2, 20.5, 21.4, 22.5, 22.9, 23.4, 25.3, 30.2, and 31.2 °2θ, ±0.2 °2θ.

128. L-Glufosinate hydrochloride Form E according to embodiment 126, wherein the XRPD pattern comprises at least ten peaks selected from 16.8, 18.2, 20.5, 21.4, 22.5, 22.9, 23.4, 25.3, 30.2, and 31.2 °2θ, ±0.2 °2θ.
129. L-Glufosinate hydrochloride Form E according to embodiment 126, wherein the XRPD pattern is substantially in accordance with FIG. 9.
130. Solid L-glufosinate ammonium, which is X-ray amorphous.

The following examples are offered by way of illustration and not by way of limitation.

EXAMPLES

Example 1: De-Racemization of Racemic D/L-Glufosinate at a 3 L Reaction Size

In this example, the reaction was run in a 3 L stirred, jacketed reactor. The following reagents were added at the start of the reaction: 900 mM D,L-glufosinate, 2700 mM glutamate, and 2,535 grams of water. After heating to 30° C., the pH was adjusted to 7.8 using approximately 45 grams of 3N NaOH. To the reactor was added 0.30 grams of antifoam AF204 (Sigma-Aldrich) and 0.60 grams of catalase dissolved in 10 mL of water. To the reactor were charged 188 grams of plastic beads on which were immobilized 6 g AC302 DAAO, and 0.9 g *E. coli* gab T transaminase followed by 400 grams of water. During the course of the stirred reaction, oxygen-enriched air (35% O2, 65% N2) was introduced at 1.7 VVM (volumes of gas per volume of reaction mixture per minute) via two stainless steel sparging stones. HPLC analysis of the reaction demonstrated that equilibrium was reached within 10 hours, with the enantiomeric excess of L-glufosinate over D-glufosinate greater than 99% and the ratio of L-glufosinate to PPO 90% to 10%. This result indicates an efficient deracemization of D/L-glufosinate into L-glufosinate by the RgDAAO/EcgabT enzyme couple at the larger scale.

Example 2: Crystallization of Glutamic Acid Using Concentrated Hydrochloric Acid Following a procedure similar to Example 1, beads were removed by filtration and the filtrate was heated to 35° C. Concentrated hydrochloric acid was slowly added to the batch until the pH reached 3.7. The batch was heated to 60° C. in a heating bath and held for 60 minutes. The heating bath was switched off and the batch was allowed to cool to ambient temperature overnight. The batch was cooled to 0° C. and held for one hour. The white precipitate was removed by filtration. The molar ratio of L-glufosinate to glutamic acid in the filtrate was determined by NMR analysis to be 88:12.

Example 3: Crystallization of Glutamic Acid Using Concentrated Sulfuric Acid

Following a procedure similar to Example 1, beads were removed by filtration and the filtrate was heated to 35° C. Concentrated sulfuric acid was slowly added to the batch until the pH reached 3.7. The batch was heated to 60° C. in a heating bath and held for 60 minutes. The heating bath was switched off and the batch was allowed to cool to ambient temperature overnight. The batch was cooled to 0° C. and held for one hour. The white precipitate was removed by filtration. The molar ratio of L-glufosinate to glutamic acid in the filtrate was determined by NMR analysis to be 85:15.

Example 4: Formation of Pyroglutamic Acid

Following a procedure similar to Example 2, a portion of the filtrate was heated to 140° C. for 3.5 hours in an autoclave. NMR analysis of a sample of the reaction mass showed a 95:5 molar ratio of L-glufosinate to glutamic acid. NMR analysis also confirmed the presence of pyroglutamic acid. No evidence of L-glufosinate decomposition was observed in the NMR result.

Example 5: Formation of Pyroglutamic Acid

Following a procedure similar to Example 3, a portion of the filtrate was further adjusted to pH 3.0 using sulfuric acid. The concentration of L-glufosinate was approximately 310 mM prior to pH adjustment. The liquid was then heated to 125° C. for 18 hours in an autoclave. NMR analysis of a sample of the reaction mass showed a 98:2 molar ratio of L-glufosinate to glutamic acid. NMR analysis also confirmed the presence of pyroglutamic acid. No evidence of L-glufosinate decomposition was observed in the NMR result.

Example 6: Concentration of Reaction Mass Followed by Formation of Pyroglutamic Acid Following a procedure similar to Example 3, the filtrate was concentrated by vacuum distillation to a concentration of L-glufosinate of approximately 412 mM. A portion of the concentrated solution was further adjusted to pH 3.0 using sulfuric acid. The liquid was then heated to 125° C. for 18 hours in an autoclave. NMR analysis of a sample of the reaction mass showed a 98:2 molar ratio of L-glufosinate to glutamic acid. NMR analysis also confirmed the presence of pyroglutamic acid. No evidence of L-glufosinate decomposition was observed in the NMR result.

Example 7: Concentration of Reaction Mass Followed by Cooling and Precipitation of Sodium Sulfate Following a procedure similar to Example 5, the reaction mass after the cyclization reaction was concentrated by vacuum distillation to a concentration of L-glufosinate of approximately 404 mM and then cooled to room temperature. A 300 mL portion of the concentrated solution was transferred to a beaker and the pH was adjusted to 6.2 by adding 11.7 grams of solid sodium hydroxide (97%, Sigma-Aldrich). The beaker was placed in a freezer at −20° C. for about 4 hours during which the entire mixture froze. The beaker was removed from the freezer and placed in an ice bath at approximately 0° C. for about four hours. Periodically during this time, the contents were gently mixed by hand. The contents of the beaker were filtered on filter paper using a Büchner funnel precooled to about 4° C. The weight of the filtrate was 247 grams and the volume of the filtrate was 215 mL. The concentration of L-glufosinate was approximately 550 mM. The total weight of the crystals after all the liquid had drained was 115 grams; HPLC analysis of the crystals indicated only a trace amount of L-glufosinate and other organic impurities. A 10-gram portion of the dry crystals was transferred to a beaker which was placed in an incubator heated to 45° C. Shortly afterward, it was observed that almost all of the crystals had melted. The melting point of sodium sulfate decahydrate is 32.38° C. according to the Handbook of Chemistry and Physics (63$^{rd}$ Ed. (1982), R. C. Weast, Ed.; CRC Press, Inc., Boca Raton, FL; page B-150). The beaker was removed from the incubator and placed in a water bath. The water bath was brought to boil. Eventually, the liquid in the beaker disappeared, leaving behind a solid. After all of the liquid had been removed from the beaker by evaporation, the beaker was cooled and the remaining solid was weighed. Approximately 4.2 grams of solid remained in the beaker.

Example 8: Formation of Pyroglutamic Acid and Purification with Cation Exchange Resin (Batch Mode)

Following a procedure similar to Example 1, beads were removed by filtration and concentrated HCl was slowly added to the batch until the pH reached 4.0. The white precipitate was removed by filtration. A portion of the filtrate was then heated to 140° C. for 4 hours in an autoclave. NMR analysis of a sample of the reaction mass showed >94% conversion of glutamic acid to pyroglutamic acid.

After cooling to room temperature, 37% HCl was added to adjust the solution to pH 1. The solution was treated with prewashed DOWEX™ 50WX8 cation exchange resin. In the treatment, the solution was allowed to mix with the resin for 30 minutes after which the resin was isolated on a filter. The resin was then washed with water and then eluted with 4M $NH_4OH$. The eluent was concentrated under vacuum to a solid containing 90-98% pure L-glufosinate and 2-10% glutamic acid both as their mono-ammonium salts as determined by NMR.

Example 9: Purification Using an Anion Exchange Resin in a Column (Flow Mode)

A jacketed glass column, 1" diameter and 24" length, was packed with a strong base anion exchange resin (DOWEX™ XUR-1525-L09-046, an experimental, gel-type, uniform particle size in the range of 300 microns, strong base anion resin, Type I (trimethylamine quaternary ammonium, in the chloride form, obtained from the Dow Chemical Company)) which had been converted to the hydroxy form. The column of resin was heated to about 60° C. and flushed with water until the pH of the effluent was approximately pH 6. To the column was pumped 270 mL of a solution prepared following a procedure similar to Example 5; prior to pumping, the solution was adjusted to pH 6 with NaOH and heated to about 60° C. The flow rate was approximately 10.5 mL/min. When the feed of the reaction mixture to the column was complete, approximately 900 mL of water adjusted to pH 6 was fed to the column. Approximately 100 mL of column effluent was collected and discarded as void volume after which 65 fractions of approximately 12 mL each were collected using a fraction collector. The fractions were analyzed by HPLC/UV and Table 1 below shows the concentrations of L-glufosinate and the other components.

TABLE 1

| Fraction # | L-glufosinate (mM) | Pyroglutamic acid (mM) | 2-oxoglutarate (mM) | PPO (mM) |
| --- | --- | --- | --- | --- |
| 1 | 0 | 0.045 | 0 | 0 |
| 4 | 0 | 0.044 | 0 | 0 |
| 7 | 10.3 | 0.11 | 1.5 | 0 |
| 10 | 104 | 0.89 | 3.1 | 0 |
| 13 | 138 | 1.06 | 2.8 | 0 |
| 16 | 165 | 0.93 | 2.3 | 0 |
| 19 | 171 | 2.57 | 2.7 | 0 |
| 22 | 182 | 17.2 | 3.5 | 0 |
| 25 | 157 | 51.4 | 0.77 | 0 |
| 7-22 | 130 | 2.08 | 2.6 | 0 |

The last row in Table 1 shows the HPLC result after fractions 7 through 22 were combined into a single solution of substantially purified L-glufosinate.

Example 10: Purification of Concentrated Reaction Mass Using an Anion Exchange Resin in a Column (Flow Mode)

A solution was prepared following a procedure similar to Example 5, except the solution was concentrated by vacuum distillation. The volume of the solution was reduced by a factor of approximately 2.3. The solution was adjusted to pH 6.7 using NaOH and heated to approximately 60° C. Following a procedure similar to Example 8, 270 mL of the solution was fed to a strong base anion resin (DOWEX™ XUR-1525-L09-046, an experimental, gel-type, uniform particle size in the range of 300 microns, strong base anion resin, Type I (trimethylamine quaternary ammonium, in the chloride form, obtained from the Dow Chemical Company)) which had been converted to the hydroxy form. Prior to feeding the solution, the column of resin was heated to about 60° C. and flushed with water until the pH of the effluent was approximately pH 6. The flow rate was approximately 10.5 mL/min. When the feed of the reaction mixture to the column was complete, approximately 900 mL water adjusted to pH 6 was fed to the column. Approximately 100 mL of column effluent was collected and discarded as void volume after which 66 fractions of approximately 15 mL each were collected using a fraction collector. The fractions were analyzed by HPLC/UV and Table 2 below shows the concentrations of L-glufosinate and other components.

TABLE 2

| Fraction # | L-glufosinate (mM) | Pyroglutamic acid (mM) | 2-oxoglutarate (mM) | PPO (mM) |
| --- | --- | --- | --- | --- |
| 1 | 0 | 0.20 | 0 | 0 |
| 4 | 0 | 0.38 | 0 | 0 |
| 7 | 148 | 2.5 | 0 | 0 |
| 10 | 281 | 0 | 0 | 0 |
| 13 | 320 | 2.5 | 0 | 0 |
| 16 | 335 | 10 | 3.7 | 0 |
| 19 | 310 | 86 | 8.9 | 0 |
| 22 | 299 | 218 | 14 | 0 |
| 25 | 179 | 9.7 | 0 | 0 |
| 6-19 | 385 | 15.7 | 3.6 | 0 |

The last row in Table 2 shows the HPLC result after fractions 6 through 19 were combined into a single solution of substantially purified L-glufosinate.

Example 11: Purification of Concentrated Reaction Mass Using an Anion Exchange Resin in a Column at 35° C. (Flow Mode)

A solution was prepared following a procedure similar to Example 5. The solution was adjusted to pH 6.2 using NaOH and heated to approximately 35° C. Following a procedure similar to Example 8, 270 mL of the solution was fed to a strong base anion resin (DOWEX™ MONOSPHERE™ 550A in hydroxide form, a product of the Dow Chemical Company). Prior to feeding the solution, the column of resin was heated to about 35° C. and flushed with water until the pH of the effluent was approximately pH 7. The flow rate was approximately 5.5 mL/min. When the feed of the reaction mixture to the column was complete, approximately 1000 mL of water adjusted to pH 7 was fed to the column. Approximately 100 mL of column effluent was collected and discarded as void volume after which 44 fractions of approximately 15 mL each were collected using a fraction collector. The fractions were analyzed by HPLC/UV and Table 3 below shows the concentrations of L-glufosinate and other components.

TABLE 3

| Fraction # | L-glufosinate (mM) | Pyroglutamic acid (mM) | 2-oxoglutarate (mM) | PPO (mM) |
|---|---|---|---|---|
| 1 | 0 | 0 | 0 | 0 |
| 3 | 0 | 0 | 0 | 0 |
| 5 | 48 | 0 | 0 | 0 |
| 7 | 319 | 2.5 | 0 | 0 |
| 9 | 187 | 3.5 | 0.54 | 0 |
| 11 | 135 | 4.6 | 1.2 | 0 |
| 13 | 116 | 8.9 | 1.3 | 0 |
| 15 | 155 | 24 | 2.1 | 0 |
| 17 | 169 | 47 | 0 | 0 |
| 19 | 152 | 64 | 0 | 0 |
| 21 | 141 | 80 | 0 | 0 |
| 23 | 62 | 103 | 0 | 0 |
| 25 | 0 | 7.9 | 0 | 0 |
| 5-15 | 113 | 5.7 | 0.6 | 0 |

The last row in Table 3 shows the HPLC result after fractions 5 through 15 were combined into a single solution of substantially purified L-glufosinate.

Example 12: Purification of the Reaction Mass Using an Anion Exchange Resin in Two Columns Operated in Series at 25° C. (Flow Mode)

Two 24" columns were packed with a strong base anion resin (DOWEX™ XUR-1525-L09-046, an experimental, gel-type, uniform particle size in the range of 300 microns, strong base anion resin, Type I (trimethylamine quaternary ammonium, in the chloride form, obtained from the Dow Chemical Company)) which had been converted to the hydroxy form. The columns were maintained at a temperature of about 25° C. Tubing and multi-port valves were connected to the inlet of each column so that reaction mixture, pH 6 water, or resin regeneration solution could be added individually. Tubing and multi-port valves were connected to the outlet of the first column so that fluid exiting the first column could either be collected by a fraction collector or transferred to the inlet of the second column. Both columns were flushed with water at about pH 6 until the pH of the effluent was approximately pH 6. A reaction mixture was prepared following a procedure similar to Example 5 and adjusted to about pH 6.4. About 270 mL of the reaction mixture was pumped to the first column at a flow rate of approximately 10.5 mL/min. Following the feed of the reaction mixture, about 210 mL of pH 6 water was fed to the column; therefore, the total volume fed to the first column was 480 mL. A total of 330 mL of fluid exiting the first column was collected in fractions of about 15 mL each. After the last fraction was collected, the valves were set to pump the next 150 mL exiting the first column to the inlet of the second column. Following the feed from the first column to the second column, about 270 mL of the reaction mixture was fed to the inlet of the second column after which 600 mL of pH 6 water was fed. Therefore, a total volume of 1020 mL was fed to the second column. All of the fluid exiting the second column was collected in fractions of about 15 mL. Fractions collected from both columns were analyzed by HPLC. Table 4 below shows fractions collected from the first column.

TABLE 4

| Fraction # | L-glufosinate (mM) | Pyroglutamic acid (mM) | 2-oxoglutarate (mM) | PPO (mM) |
|---|---|---|---|---|
| 1 | 0 | 0 | 0 | 0 |
| 4 | 0 | 0 | 0 | 0 |
| 5 | 30 | 0 | 0 | 0 |
| 6 | 70 | 0 | 0 | 0 |
| 7 | 111 | 0 | 0 | 0 |
| 10 | 156 | 1.1 | 0 | 0 |
| 13 | 178 | 12 | 0 | 0 |
| 16 | 186 | 50 | 1.0 | 0 |
| 7-15 | 146 | 6.4 | 0.7 | 0 |

The last row in Table 4 shows the HPLC result after fractions 7 through 15 were combined into a single solution of substantially purified L-glufosinate.

Table 5 below shows fractions collected from the second column.

TABLE 5

| Fraction # | L-glufosinate (mM) | Pyroglutamic acid (mM) | 2-oxoglutarate (mM) | PPO (mM) |
|---|---|---|---|---|
| 1 | 0 | 0 | 0 | 0 |
| 4 | 0 | 0 | 0 | 0 |
| 7 | 0 | 0 | 0 | 0 |
| 10 | 0 | 0.54 | 0 | 0 |
| 13 | 85 | 0 | 0 | 0 |
| 16 | 159 | 0 | 0 | 0 |
| 19 | 89 | 4.9 | 0 | 0 |
| 22 | 159 | 24 | 0 | 0 |
| 25 | 166 | 55 | 0 | 0 |
| 28 | 177 | 86 | 0 | 0 |
| 31 | 174 | 111 | 0 | 0 |
| 34 | 184 | 135 | 0 | 0 |
| 37 | 181 | 560 | 4.0 | 0 |
| 40 | 0 | 3.1 | 0 | 0 |
| 12-22 | 131 | 4.5 | 0.7 | 0 |

The last row in Table 5 shows the HPLC result after fractions 12 through 22 were combined into a single solution of substantially purified L-glufosinate.

Example 13: Production of Purified 2-Oxoglutaric Acid Obtained after Anion Exchange Purification and Resin Regeneration Following a procedure similar to Example 8, after the feed of water adjusted to pH 6 to the column was complete, a solution of 0.1 M sodium hydroxide and 1.5 sodium chloride was fed to the column at about 60° C. and approximately 10.5 mL/min; 88 fractions of 15 mL each were collected. Analysis of the fractions by HPLC showed that 2-oxoglutaric acid eluted over a very narrow range of fractions as shown in Table 6 below.

TABLE 6

| Fraction # | L-glufosinate (mM) | Pyroglutamic acid (mM) | 2-oxoglutarate (mM) | PPO (mM) |
|---|---|---|---|---|
| 1 | 0 | 0.14 | 0 | 0 |
| 11 | 0 | 0.89 | 1.2 | 0 |
| 22 | 0 | 1.2 | 3.0 | 0 |
| 27 | 0 | 0.69 | 113 | 0 |
| 28 | 0 | 0 | 325 | 0 |
| 30 | 0 | 0 | 66 | 0 |
| 33 | 0 | 0 | 2.7 | 0 |
| 44 | 0 | 0.47 | 0 | 0 |

2-Oxoglutarate was not detected in fraction 44 or any other fraction collected after fraction 44 and selected for analysis.

The amount of 2-oxoglutarate in this experiment exceeds the amount expected from a single ion exchange experiment. Not to be bound by theory, it is likely that the resin was not sufficiently regenerated prior to this experiment.

Example 14: Production of Succinic Acid from 2-Oxoglutaric Acid Obtained after Anion Exchange Purification and Resin Regeneration Following a procedure similar to Example 12, a fraction containing 180 mM 2-oxoglutarate was produced. A 0.266 mL sample of this fraction was combined with 1.5 molar equivalents of hydrogen peroxide (0.128 M) and diluted to a total volume of 0.5 mL in a container. The container was shaken at 30° C. and sampled approximately every 5 minutes for HPLC analysis. After 10 minutes, approximately 70% of the 2-oxoglutamic acid had been converted to succinic acid.

Example 15: Decolorization of Reaction Mixture Obtained after Converting Glutamic Acid to Pyroglutamic Acid Various amounts of activated carbon (0.25 wt. %, 0.5 wt. %, 1.0 wt. %, 3.0 wt. %, and 5.0 wt. %) were added to portions of a reaction mixture resulting from the conversion of glutamic acid to pyroglutamic acid, as described above. After mixing for approximately 20 minutes at room temperature, the activated carbon was filtered on top of a bed of pre-washed Celite®. The resulting filter cake was then washed with water and the cake was combined with the filtrate. The filtrate was then checked for L-glufosinate recovery relative to an untreated sample using pyroglutamic acid as an internal standard. Table 7 below shows the recovery and color observations.

TABLE 7

| Activated carbon (wt. %) | L-glufosinate recovery (%) | Color observation |
|---|---|---|
| 0.25 | 104 | Slightly orange |
| 0.5 | 103 | Slightly orange |
| 1.0 | 98 | Slightly orange |
| 3.0 | 103 | No color |
| 5.0 | 98 | No color |

Example 16: Preparation and Characterization of L-Glufosinate Polymorphs

Two lots of L-glufosinate ammonium were received and used in the studies described below. XRPD analysis of one of the lots confirmed the sample to be x-ray amorphous. IC analysis of another lot showed the ammonium content of the sample to be substoichiometric.

Solubility levels of L-glufosinate ammonium were determined, showing that the material was very soluble in water and poorly soluble in most organic solvents. Organic/aqueous mixtures were prone to oil formation. Organic solubility generally remained poor in solvents such as dimethyl sulfoxide, dimethyl acetamide, and N-methyl-2-pyrrolidone. Trifluoroethanol (TFE) was the only organic solvent to show solubility of >2 mg/mL.

The polymorph screen of L-glufosinate ammonium was conducted using different crystallization techniques to vary conditions of nucleation and growth investigating both thermodynamic and kinetic conditions. Crystallization techniques included slurrying at room temperature and elevated temperature, evaporation, antisolvent addition/precipitation, and cooling. Kinetic factors such as cooling rate, evaporation rate, or antisolvent addition rate were varied during these experiments. Non-solvent based techniques such as vapor stress and heating of the L-glufosinate ammonium amorphous material above the glass transition temperature were also utilized.

An attempt was made to vary the solvent systems utilized during the polymorph screen however due to the limited solubility in most organic solvent systems, in many cases water or TFE were added to improve the solubility. Experiments in neat solvents generally consisted of long term slurries at room temperature or elevated temperature. The formation of hydrates was also investigated through crystallization experiments conducted in water and aqueous-organic systems with varying water activities, however gels and oils were observed in many of these solvent systems. Anhydrous conditions were also investigated to determine if new forms could be generated under these conditions. In these experiments, the L-glufosinate ammonium starting material was pre-dried over desiccant to remove any potential residual moisture from the starting material.

Selected crystallization experiments were conducted utilizing excess ammonium hydroxide due to the sub-stoichiometric amount of ammonium observed in some of the starting materials. Similarly, a few experiments were conducted under acidic conditions with HCl.

Five unique crystalline L-glufosinate materials were observed during the screen and were designated as Form A, Form B, Form C, Form D, and Form E. Form A and Form C appear to be metastable forms of L-glufosinate ammonium that are prone to conversion to Form B. Form B and Form D appear to be anhydrous crystalline forms of the L-glufosinate free form. Form E is an apparent L-glufosinate HCl salt.

Crash Cooling (CC): Solutions of L-glufosinate ammonium were prepared in selected solvents or solvent mixtures at elevated temperature. Once the clear solution was obtained after visual observation, the solution was filtered through a 0.2 µm or 0.45 µm syringe filter into a preheated vial. The vial was then capped and immediately placed in a precooled reactor at sub-ambient temperature. The solids were collected by centrifugal or vacuum filtration and analyzed.

Conversion Slurry: Form B with additional peaks was slurried in ethanol/water (95/5 v/v) at ambient temperature for one day. Seeds of BIPXAZ (Cambridge Structural Database, Version 5.38, November 2016) with additional peaks and Form D were added and the mixture was slurried for an extended period at ambient temperature. The solids were collected by centrifugal filtration and then analyzed.

Fast Cooling (FC): Solutions of L-glufosinate ammonium were prepared in selected solvents or solvent mixtures at elevated temperature. Once the clear solution was obtained after visual observation, the solution was filtered through a 0.2 µm or 0.45 µm syringe filter into a preheated vial. The vial was then capped and immediately placed at ambient temperature. The solids were collected by centrifugal or vacuum filtration and analyzed.

Fast Evaporation (FE): Solutions of L-glufosinate ammonium were prepared in selected solvents or solvent mixtures at ambient temperature. Once the clear solution was obtained after visual observation, the solution was filtered through a 0.2 µm or 0.45 µm syringe filter into a clean vial.

The solution was then allowed to evaporate under ambient temperatures. The solids were collected in a closed vial and then analyzed.

Rotary Evaporation: Solutions of L-glufosinate ammonium were prepared in various solvents at ambient temperature. The solution was filtered into a clean vial and solvent-stripped using a rotary evaporator. The solids were collected in a closed vial and then analyzed.

Slow Cooling: Solutions of L-glufosinate ammonium were prepared in different solvents or solvent mixtures at elevated temperature in a metal block. Once the clear solution was obtained after visual observation, the solution was filtered through a 0.2 µm or 0.45 µm syringe filter in a preheated vial. The solution was then allowed to cool slowly to ambient temperature. The solids were collected by centrifugal or vacuum filtration and then analyzed.

Slurry: Slurries of L-glufosinate ammonium were prepared by adding sufficient solids to a given solvent or solvent mixture at ambient or elevated temperature such that undissolved solids were present. The mixture was then stirred in a closed vial at ambient, sub-ambient or elevated temperature for an extended period of time. The solids were collected by centrifugal or vacuum filtration and then analyzed.

Vapor Stress (VS): Solids of L-glufosinate ammonium was transferred to a 1-dram vial, which was then placed inside a 20-mL vial containing solvent. The 1-dram vial was left uncapped and the 20-mL vial was capped to allow vapor stressing to occur. Vapor stressing experiments were conducted at ambient and temperatures. Solids were isolated by decantation and analyzed.

Vapor Diffusion (VD): Concentrated solutions of L-glufosinate ammonium were prepared in different solvents or solvent mixtures at ambient temperature in a metal block. Once the clear solution was obtained after visual observation, the solution was filtered through a 0.2 µm or 0.45 µm nylon syringe filter in a clean vial. This vial was placed uncapped in a larger vial containing an antisolvent. The larger vial was capped to allow vapor diffusion to occur. Solids were isolated by decantation, collected in a closed vial and then analyzed.

Differential Scanning calorimetry (DSC): DSC was performed using a Mettler Toledo TGA/DSC 3+. Temperature calibration was performed using NIST-traceable indium metal. Temperature calibration was performed using adamantane, phenyl salicylate, indium, tin, and zinc. The sample was placed into an aluminum DSC pan, covered with a lid, and the weight was accurately recorded. A weighed aluminum pan configured as the sample pan was placed on the reference side of the cell. The pan lid was pierced prior to sample analysis. Data were obtained using a heating rate of 10° C./min over the range of ambient temperature to 350° C. or cycled from ambient temperature to −30° C. to 250° C.

Modulated DSC data were obtained on a TA Instruments Q2000 differential scanning calorimeter equipped with a refrigerated cooling system (RCS). Temperature calibration was performed using NIST-traceable indium metal. The sample was placed into an aluminum DSC pan, and the weight was accurately recorded. The pan was covered with a lid perforated with a laser pinhole, and the lid was crimped. A weighed, crimped aluminum pan was placed on the reference side of the cell. Data were obtained using a modulation amplitude of ±0.08° C. and a 60 second period with an underlying heating rate of 2° C./minute from ambient temperature to 300° C. The reported glass transition temperatures are obtained from the inflection point of the step change in the reversing heat flow versus temperature curve.

Thermogravimetric (TG) Analysis: TG analysis was performed using a Mettler Toledo TGA/DSC3+ analyzer or a TA Instruments Q5000 IR thermogravimetric analyzer. Q5000IR. Temperature calibration was performed using phenyl salicylate, indium, tin, and zinc. The sample was placed in an aluminum pan. The sample was sealed, the lid pierced, then inserted into the TG furnace. The furnace was heated under nitrogen. Data were obtained using a heating rate of 10° C./min over the range of ambient temperature to 350° C.

Nuclear Magnetic Resonance (NMR) Spectroscopy: The solution NMR spectrum was acquired with an Agilent DD2-400 spectrometer at SSCI. The sample was prepared by dissolving a small amount of sample in $D_2O$/TSP-d2. Additional data were acquired at Spectral Data Services, Inc., Champaign, Illinois in $D_2O$/TSP-d2 or $CF_3CD_2OD$. The data acquisition parameters are displayed in the first each plot of the spectrum in the Data section of this report.

Polarized Light Microscopy (PLM): Polarized light microscopy was performed using an optical microscope with crossed polarizers or a stereomicroscope with first order red compensator.

X-ray Power Diffraction (XRPD), Reflection Mode: XRPD patterns were collected with a PANalytical X'Pert PRO MPD diffractometer using an incident beam of Cu Kα radiation produced using a long, fine-focus source and a nickel filter. The diffractometer was configured using the symmetric Bragg-Brentano geometry. Prior to the analysis, a silicon specimen (NIST SRM 640e) was analyzed to verify the observed position of the Si 111 peak is consistent with the NIST-certified position. A specimen of the sample was prepared as a thin, circular layer centered on a silicon zero-background substrate. Antiscatter slits (SS) were used to minimize the background generated by air. Soller slits for the incident and diffracted beams were used to minimize broadening from axial divergence. Diffraction patterns were collected using a scanning position-sensitive detector (X'Celerator) located 240 mm from the sample and Data Collector software v. 2.2b.

XRPD, Transmission Mode: XRPD patterns were collected with a PANalytical X'Pert PRO MPD diffractometer using an incident beam of Cu radiation produced using an Optix long, fine-focus source. An elliptically graded multilayer mirror was used to focus Cu Kα X-rays through the specimen and onto the detector. Prior to the analysis, a silicon specimen (NIST SRM 640e) was analyzed to verify the observed position of the Si 111 peak is consistent with the NIST-certified position. A specimen of the sample was sandwiched between 3-µm-thick films and analyzed in transmission geometry. A beam-stop, short antiscatter extension, antiscatter knife edge were used to minimize the background generated by air. Soller slits for the incident and diffracted beams were used to minimize broadening from axial divergence. Diffraction patterns were collected using a scanning position-sensitive detector (X'Celerator) located 240 mm from the specimen and Data Collector software v. 2.2b.

1. Form A

L-Glufosinate ammonium Form A was first prepared from an IPA slurry of material that had been stripped from an aqueous solution. Form A was the most frequently observed material prepared during the study, although it was frequently observed as a mixture with Form D, Form C, or x-ray amorphous material. Form A was generated from several long term slurries at elevated temperature or room temperature.

Figure 2:
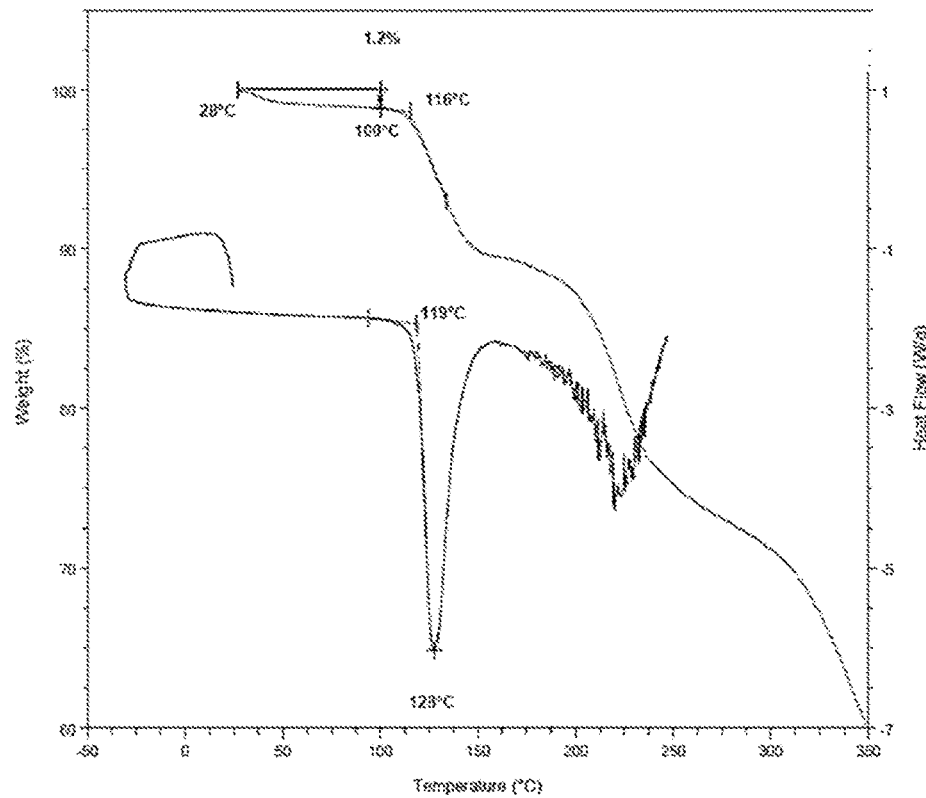
FIG. 2 shows thermal data collected for L-glufosinate ammonium Form A by thermogravimetric analysis (top trace) and differential scanning calorimetry (bottom trace).

In one instance, Form A was isolated from a seven day slurry in 93/7 v/v methanol/water. The XRPD pattern for the sample indicated that the sample was composed primarily of a single crystalline phase (FIG. 1). A minor additional peak was observed at a diffraction angle of ~19.0°. The $^1$H NMR spectrum of the material was consistent with L-glufosinate and contained chemical shifts consistent with methanol. Ion chromatography analysis indicated 6.4 wt % ammonium content which is less than would be expected for a theoretical mono ammonium salt (9.1 wt %) and slightly less than the as-received material (7.0 wt %). Thermal analysis of the material was consistent with an anhydrous/non-solvated form. No significant events were observed in the DSC prior to a large endotherm at ~123° C. (onset). A significant change in the slope of the TGA was observed around this temperature suggesting a potential melt/decomposition event. It was noted that the thermal behavior of this sample was very similar to L-glufosinate Form B. The sample was reanalyzed by XRPD and it was found that Form A had converted to Form B with minor additional peaks upon storage over desiccant. The results suggest that Form A is metastable and prone to conversion.

A new sample of Form A was prepared by slurrying as-received L-glufosinate ammonium in methanol with ~1 molar excess of ammonium hydroxide. Thermal analysis of this sample (FIG. 2) however was consistent with the previous analysis showing minor weight loss prior to a significant weight loss beginning at ~116° C. likely due to the onset of decomposition of the material. A single endotherm was observed with an onset of ~119° C. The data is suggestive of a melt/decomposition event.

2. Form B

Form B of L-glufosinate was initially observed from a multistep crystallization involving slurrying L-glufosinate ammonium in IPA/water to form a gel and reslurry of the gel in acetone at room temperature. Form B was recovered from several slurries typically involving organic-water mixtures at higher water activities. The XRPD pattern of Form B was successfully indexed (FIG. 3) however several minor additional peaks were observed in the pattern. In fact, Form B was typically observed with minor additional peaks.

Form B was characterized by $^1$H NMR, IC, DSC, and TGA. The $^1$H NMR spectrum was consistent with L-glufosinate and showed no residual organic solvent. Ion chromatography analysis of a different Form B sample showed only minor ammonium content (0.17 wt %) suggesting that Form B is not the ammonium salt but rather a crystalline form of the L-glufosinate zwitterion. Thermal analysis of the sample (FIG. 4) was consistent with a nonsolvated/anhydrous crystalline form. No significant thermal events were observed prior to a large endotherm at 123° C. (onset). A significant change in the slope of the TGA was also observed near this temperature suggesting this is a likely melt/decomposition event. No significant changes were observed in the XRPD pattern of the sample upon storage over desiccant for 47 days.

3. Form C

Figure 5:
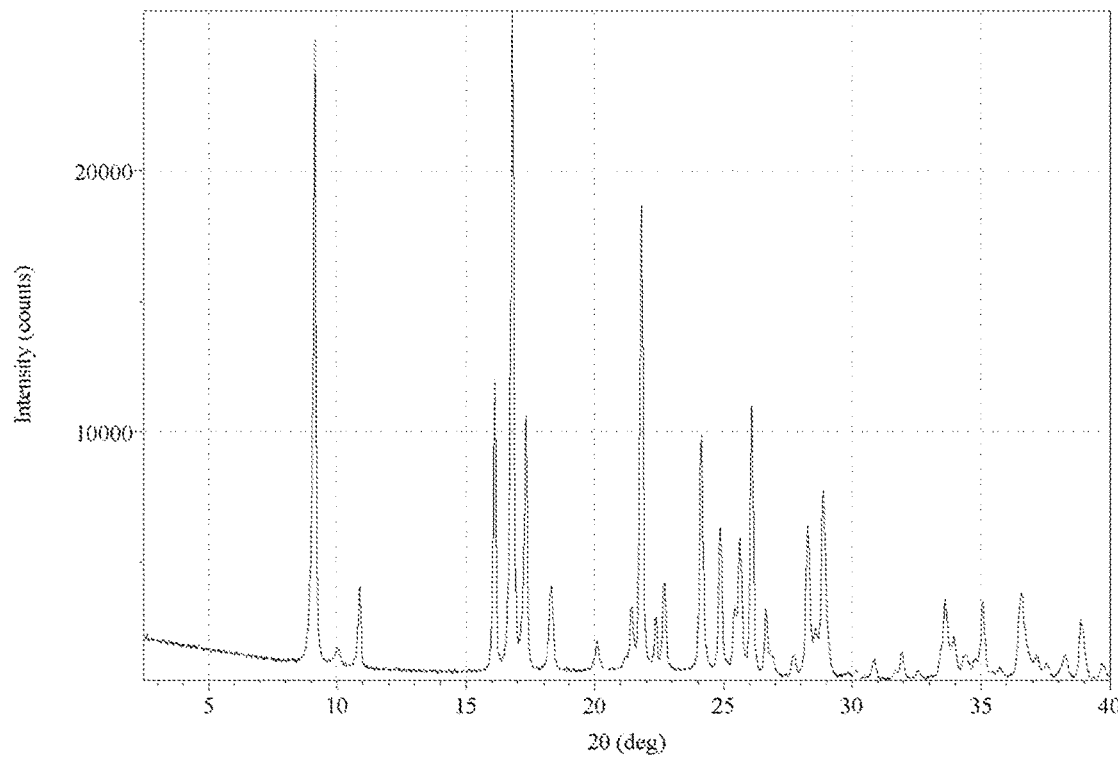
FIG. 5 shows an XRPD pattern collected with Cu-Kα radiation for L-glufosinate ammonium Form C.

Form C with minor Form A was prepared via stress of L-glufosinate ammonium with MeOH vapor. The XRPD pattern for Form C was indexed, however several peaks were observed that are consistent with Form A (FIG. 5). The $^1$H NMR spectrum was consistent with L-glufosinate however ion chromatography indicated that the ammonium content was sub-stoichiometric (6.3 wt % compared with 9.1 wt % for a theoretical mono salt and 7.0 wt % for the as-received material).

The sample of Form C with minor Form A was stored under desiccant for 36 days and XRPD analysis of the sample showed conversion to Form B with minor Form A and a few minor additional peaks. IC analysis also showed a significant loss of ammonium content over that time (3.2 wt % vs 6.3 wt % initially). The results suggest that Form C is metastable and prone to form conversion/dissociation of the ammonium salt on long term storage under desiccant.

Figure 6:
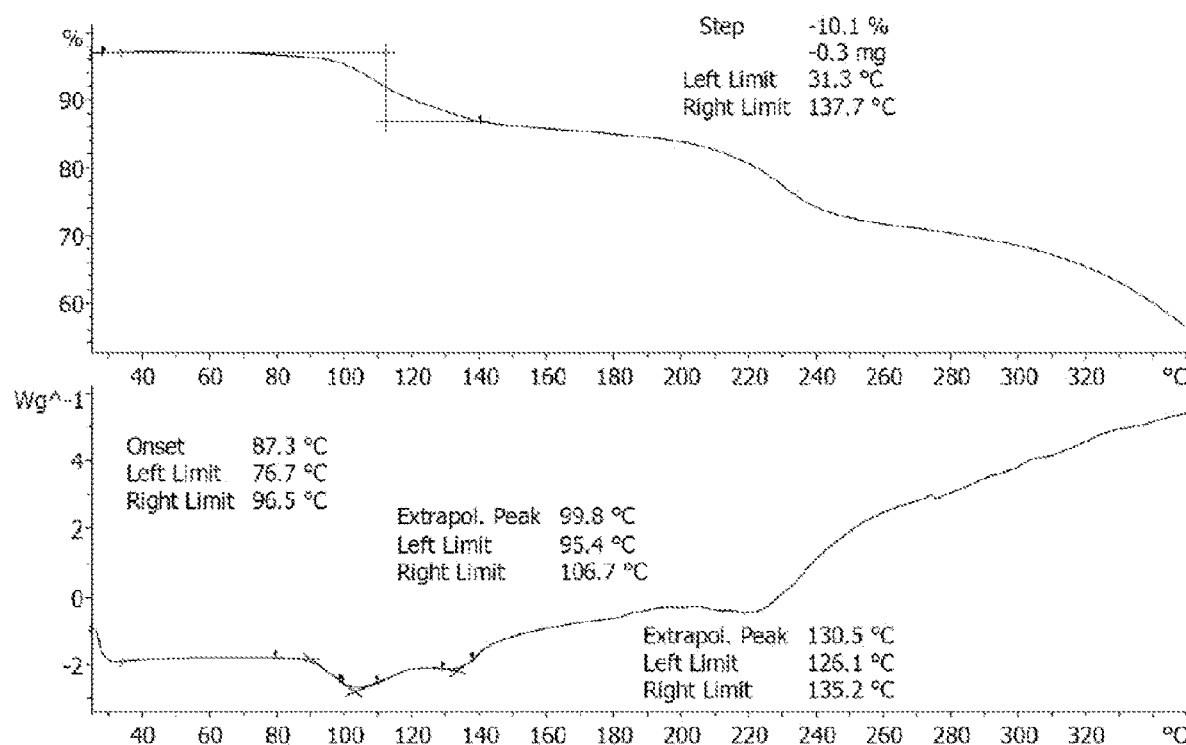
FIG. 6 shows thermal data collected for L-glufosinate ammonium Form C by thermogravimetric analysis (top trace) and differential scanning calorimetry (bottom trace)

Form C with minor Form A was successfully re-prepared via vapor stress with MeOH. $^1$H NMR analysis of the new sample was consistent with the chemical structure of L-glufosinate. Thermal analysis showed two overlapping broad endotherms at 100° C. and 131° C. (FIG. 6). A weight loss of ~10 wt % was observed with the endotherms followed by gradual weight loss upon continued heating.

4. Form D

Form D was prepared from several room temperature or elevated temperature slurries in the polymorph screen, typically as a mixture with Form A. A mixture of Form A and Form D was found to be consistent with the chemical structure of L-glufosinate by $^1$H NMR analysis. No significant changes were observed in the XRPD pattern of a sample of Form D+ minor Form A upon storage over desiccant.

Form D was isolated from a three day slurry at 60° C. in 50/50 v/v TFE/acetone. The XRPD pattern of Form D (FIG. 7) indicated that the sample is composed primarily or exclusively of a single crystalline phase. Ion chromatography analysis indicated 2.3 wt % ammonium content which is significantly less than would be expected for a theoretical mono ammonium salt (9.1 wt %). Based on the substoichiometric amount of ammonium present, Form D is likely a crystalline form of the L-glufosinate zwitterion. Thermal analysis of the sample (FIG. 8) showed consistent gradual weight loss and a change in slope around 151° C. suggestive of the onset of decomposition. A very broad endotherm was observed with an onset of ~140° C. suggestive of a melt/decomposition event.

5. Form E

Form E was observed during initial screening, as an as-received sample, and as a sample crystallized from aqueous acetone with HCl. The $^1$H NMR spectrum of Form E was consistent with L-glufosinate with peak shifting suggestion potential ionization differences. IC analysis showed only a trace amount of ammonium along with a stoichiometric amount of chloride. The results suggest that Form E is not a form of L-glufosinate ammonium but a form of L-glufosinate HCl.

6. Amorphous Material

X-ray amorphous material was collected from slurries in solvents such as N-methyl-2-pyrrolidone (NMP), tetrahydrofuran (THF), and 2,2,2-trifluoroethanol (TFE), which were maintained at temperatures ranging from 50° C. to 60° C. for extended periods (e.g., 12 days). $^1$H NMR analysis of amorphous L-glufosinate ammonium was consistent with the structure and showed the presence of minor unknown peaks. Thermal analysis of the material revealed an apparent glass transition, Tg, at ~55° C.

It is understood that the terminology used herein is for the purpose of describing particular embodiments only, and the terminology is not intended to be limiting. The scope of the invention will be limited only by the appended claims. Unless defined otherwise, all technical and scientific terms used herein have the same meaning as commonly understood by one of ordinary skill in the art to which this invention belongs. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about" or the term "around". The term "about" and "around" are used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number. If "X" were the value modified by "about" or "around," "about X" or "around X" would generally indicate a value from 0.95X to 1.05X including, for example, from 0.98X to 1.02X or from 0.99X to 1.01X. Any reference to "about X" or "around X" specifically indicates at least the values X, 0.95X, 0.96X, 0.97X, 0.98X, 0.99X, 1.01X, 1.02X, 1.03X, 1.04X, and 1.05X. Thus, "about X" and "around X" are intended to teach and provide written description support for a claim limitation of, e.g., "0.98X."

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided might be different from the actual publication dates, which may need to be independently confirmed.

It is noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method may be carried out in the order of events recited or in any other order that is logically possible. Although any methods and materials similar or equivalent to those described herein may also be used in the practice or testing of the invention, representative illustrative methods and materials are now described.

What is claimed is:

1. An L-Glufosinate crystalline form, the crystalline form characterized by an X-ray powder diffraction (XRPD) pattern comprising at least three peaks selected from 9.1, 11.6, 13.1, 14.1, 14.4, 16.2, 17.7, 18.2, 18.9, 19.3, 19.7, 21.2, 21.8, 22.4, 23.2, 23.5, 25.3, 25.8, 26.2, 27.2, 28.6, 29.1, 30.0, 30.6, 31.1, 31.6, 32.7, 33.5, 34.4, 34.7, 35.4, 35.9, 36.4, and 37.4 °2θ, ±0.2 °2θ, as determined on a diffractometer using Cu-Kα radiation, wherein the XRPD pattern comprises at least one peak at 9.1, 11.6, or 13.1 °2θ, ±0.2 °2θ, as determined on a diffractometer using Cu-Kα radiation.

2. The L-Glufosinate crystalline form according to claim 1, wherein the XRPD pattern comprises at least six peaks selected from 9.1, 17.7, 18.2, 18.9, 22.4, 23.2, 23.5, 26.2, 33.5, and 36.4 °2θ, ±0.2 °2θ.

3. The L-Glufosinate crystalline form according to claim 1, wherein the XRPD pattern comprises peaks at 9.1, 17.7, 18.2, 18.9, 22.4, 23.2, 23.5, 26.2, 33.5, and 36.4 °2θ, ±0.2 °2θ.

4. The L-Glufosinate crystalline form according to claim 1, wherein the form has the XRPD pattern of FIG. 7.

\* \* \* \* \*